(12) United States Patent
Agnon et al.

(10) Patent No.: US 10,683,852 B2
(45) Date of Patent: Jun. 16, 2020

(54) SYSTEM AND METHOD FOR ENERGY CONVERSION

(71) Applicant: Technion Research & Development Foundation Limited, Haifa (IL)

(72) Inventors: Yehuda Agnon, Shechania (IL); Guy Ramon, RaAnana (IL); Carlos Dosoretz, Carmiel (IL)

(73) Assignee: Technion Research & Development Foundation Limited, Haifa (IL)

( * ) Notice: Subject to any disclaimer, the term of this patent is extended or adjusted under 35 U.S.C. 154(b) by 78 days.

(21) Appl. No.: 15/414,789

(22) Filed: Jan. 25, 2017

(65) Prior Publication Data

US 2017/0130702 A1    May 11, 2017

Related U.S. Application Data

(62) Division of application No. 13/810,469, filed as application No. PCT/IL2011/000569 on Jul. 19, 2011, now Pat. No. 9,562,522.

(Continued)

(51) Int. Cl.
*B01D 53/02* (2006.01)
*F03G 7/00* (2006.01)
(Continued)

(52) U.S. Cl.
CPC ............. *F03G 7/00* (2013.01); *B01D 51/08* (2013.01); *F03G 7/002* (2013.01); *F25B 9/145* (2013.01);
(Continued)

(58) Field of Classification Search
CPC . B01D 51/08; F02G 2243/52; F02G 2243/54; F03G 7/00; F03G 7/002; F25B 2309/1413; F25B 9/145
See application file for complete search history.

(56) References Cited

U.S. PATENT DOCUMENTS 2,836,033 A    5/1958   Marrison
2,952,153 A *  9/1960   Robinson ............... G01N 29/02
                                                  73/23.4

(Continued)

FOREIGN PATENT DOCUMENTS

CN         85104889        9/1986
CN         1055982        11/1991
(Continued)

OTHER PUBLICATIONS

Communication Relating to the Results of the Partial International Search dated Jun. 15, 2012 From the International Searching Authority Re. Application No. PCT/IL2011/000569.

(Continued)

*Primary Examiner* — Christopher P Jones

(57) ABSTRACT

According to an aspect of some embodiments of the present invention there is provided a method for converting energy. The method comprises receiving energy from an external source, using the received energy for inducing a mass exchange process to release thermodynamic energy, and converting the thermodynamic energy directly into electrical energy at sufficient amount for performing work therewith. In some embodiments of the present invention, a portion of the released energy is converted to a pressure wave, and the mechanical energy constituted by the pressure wave is converted to non-mechanical energy.

10 Claims, 13 Drawing Sheets

Low vapor pressure

High vapor pressure

Related U.S. Application Data

(60) Provisional application No. 61/365,390, filed on Jul. 19, 2010.

(51) Int. Cl.
  *F25B 9/14* (2006.01)
  *B01D 51/08* (2006.01)

(52) U.S. Cl.
  CPC ...... *F02G 2243/52* (2013.01); *F02G 2243/54* (2013.01); *F25B 2309/1413* (2013.01)

(56) References Cited

U.S. PATENT DOCUMENTS

| | | | |
|---|---|---|---|
| 3,169,508 A * | 2/1965 | Rich | G10K 5/02 116/137 A |
| 4,114,380 A | 9/1978 | Ceperley | |
| 4,280,823 A | 7/1981 | Szonntagh | |
| 4,355,517 A | 10/1982 | Ceperley | |
| 4,398,398 A | 8/1983 | Wheatley et al. | |
| 4,475,921 A | 10/1984 | Barmatz | |
| 4,489,553 A | 12/1984 | Wheatley et al. | |
| 4,523,682 A | 6/1985 | Barmatz et al. | |
| 4,722,201 A | 2/1988 | Hofler et al. | |
| 4,759,775 A | 7/1988 | Peterson et al. | |
| 5,020,977 A | 6/1991 | Lucas | |
| 5,085,783 A | 2/1992 | Feke et al. | |
| 5,263,341 A | 11/1993 | Lucas | |
| 5,303,555 A | 4/1994 | Chrysler et al. | |
| 5,339,639 A | 8/1994 | Garrett | |
| 5,626,767 A * | 5/1997 | Trampler | B01D 21/283 210/748.05 |
| 5,647,216 A | 7/1997 | Garrett | |
| 5,673,561 A | 10/1997 | Moss | |
| 5,711,888 A * | 1/1998 | Trampler | B01D 21/283 210/748.05 |
| 5,857,340 A * | 1/1999 | Garrett | F25B 9/145 62/467 |
| 5,953,921 A | 9/1999 | Garrett | |
| 6,032,464 A | 3/2000 | Swift et al. | |
| 6,164,073 A | 12/2000 | Swift et al. | |
| 6,221,258 B1 | 4/2001 | Feke et al. | |
| 6,314,740 B1 | 11/2001 | De Blok et al. | |
| 6,688,112 B2 | 2/2004 | Raspet et al. | |
| 6,733,569 B2 | 5/2004 | Geller et al. | |
| 6,804,967 B2 | 10/2004 | Symko et al. | |
| 7,263,837 B2 | 9/2007 | Smith | |
| 2002/0154571 A1 | 10/2002 | Cefai et al. | |
| 2003/0101734 A1 | 6/2003 | Raspet et al. | |
| 2004/0231341 A1 | 11/2004 | Smith | |
| 2008/0053787 A1* | 3/2008 | Bagajewicz | B01D 61/00 196/111 |
| 2008/0060364 A1 | 3/2008 | Watanebe et al. | |
| 2008/0223042 A1 | 9/2008 | Wiesner | |
| 2009/0268556 A1 | 10/2009 | Jiang et al. | |
| 2010/0064680 A1 | 3/2010 | Watanabe et al. | |
| 2010/0077919 A1 | 4/2010 | Sinha | |
| 2010/0172213 A1 | 7/2010 | Qian et al. | |
| 2011/0025073 A1 | 2/2011 | Garner et al. | |
| 2011/0259003 A1 | 10/2011 | Yamamoto | |
| 2013/0111894 A1 | 5/2013 | Agnon et al. | |

FOREIGN PATENT DOCUMENTS

| | | |
|---|---|---|
| EP | 0447134 | 9/1991 |
| JP | 10-115220 | 5/1998 |
| JP | 2005-345023 | 12/2005 |
| WO | WO 2007/118282 | 10/2007 |
| WO | WO 2012/011096 | 1/2012 |

OTHER PUBLICATIONS

Corrected Notice of Allowability dated Oct. 7, 2016 From the U.S. Appl. No. 13/810,469.
International Preliminary Report on Patentability dated Jan. 31, 2013 From the International Bureau of WIPO Re. Application No. PCT/IL2011/000569.
International Search Report and the Written Opinion dated Aug. 30, 2012 From the International Searching Authority Re. Application No. PCT/IL2011/000569.
Notice of Allowance dated Sep. 28, 2016 From the U.S. Appl. No. 13/810,469.
Notification of Office Action and Search Report dated Nov. 4, 2015 From The State Intellectual Property Office of the People's Republic of China Re. Application No. 201180044911.9 and Its Translation Into English.
Notification of Office Action dated Sep. 2, 2016 From The State Intellectual Property Office of the People's Republic of China Re. Application No. 201180044911.9 and Its Translation Into English.
Notification of Office Action dated Feb. 28, 2015 From The State Intellectual Property Office of the People's Republic of China Re. Application No. 201180044911.9.
Notification of Office Action dated Apr. 29, 2016 From The State Intellectual Property Office of the People's Republic of China Re. Application No. 201180044911.9.
Office Action dated May 15, 2016 From the Israel Patent Office Re. Application No. 224287 and Its Translation Into English.
Office Action dated Apr. 27, 2015 From the Israel Patent Office Re. Application No. 224287.
Official Action dated Jun. 6, 2015 From the U.S. Appl. No. 13/810,469.
Official Action dated Mar. 16, 2016 From the U.S. Appl. No. 13/810,469.
Restriction Official Action dated Mar. 20, 2015 From the U.S. Appl. No. 13/810,469.
Translation Dated Mar. 12, 2015 of Notification of Office Action dated Feb. 28, 2015 From The State Intellectual Property Office of the People's Republic of China Re. Application No. 201180044911.9.
Translation Dated May 18, 2015 of Office Action dated Apr. 27, 2015 From the Israel Patent Office Re. Application No. 224287.
Translation of Notification of Office Action dated Apr. 29, 2016 From The State Intellectual Property Office of the People's Republic of China Re. Application No. 201180044911.9.
Hiller et al. "Condensation in a Steady-Flow Thermoacoustic Refrigerator", Journal of the Acoustic Society of America, 108(4): 1521-1527, Oct. 2000.
Notification of Office Action and Search Report dated Aug. 22, 2018 From The State Intellectual Property Office of the People's Republic of China Re. Application No. 201710164679.1 and Its Translation Into English. (16 Pages).
Office Action dated Feb. 7, 2017 From the Israel Patent Office Re. Application No. 247608 and Its Translation Into English. (7 Pages).
Examination Report Under Sections 12 & 13 of the Patents Act, 1970 and the Patents Rules, 2003 dated Jun. 8, 2018 From the Government of India, Intellectual Property India, Patents, Designs, Trade Marks, Geographical Indications Re. Application No. 158/MUMNP/2013. (7 Pages).
Office Action dated Aug. 16, 2018 From the Israel Patent Office Re. Application No. 247608 and Its Translation Into English. (8 Pages).
Hearing Notice Dated Oct. 23, 2019 From the Government of India, Patent Office, Intellectual Property Building Re. Application No. 158/MUMNP/2013. (4 Pages).

* cited by examiner

SYSTEM AND METHOD FOR ENERGY CONVERSION

RELATED APPLICATIONS

This application is a division of U.S. patent application Ser. No. 13/810,469 filed on Jan. 16, 2013 which is a National Phase of PCT Patent Application No. PCT/IL2011/000569 having International Filing Date of Jul. 19, 2011, which claims the benefit of priority under 35 USC § 119(e) of U.S. Provisional Patent Application No. 61/365,390, filed on Jul. 19, 2010. The contents of the above applications are all incorporated by reference as if fully set forth herein in their entirety.

FIELD AND BACKGROUND OF THE INVENTION

The present invention, in some embodiments thereof, relates to renewable energy, and, more particularly, but not exclusively, to a system and method for energy conversion based on phase-exchange processes.

According to thermodynamic principles, acoustic power in a gas is as valuable as other forms of work such as electrical power, rotating shaft power, and hydraulic power. For example, acoustic power can be used to produce refrigeration, such as in orifice pulse tube refrigerators; it can be used to produce electricity, via linear alternators; and it can be used to generate rotating shaft power, e.g., with a Wells turbine. Furthermore, acoustic power can be created from heat in a variety of heat engines such as Stirling engines and thermoacoustic engines.

Stirling's hot-air engine of the early 19th century was the first heat engine to use oscillating pressure and oscillating volume flow rate in a gas in a sealed system, although the time-averaged product thereof was not called acoustic power. It was subsequently recognized that the Stirling cycle could be reversed to produce useful cooling, if mechanical energy was provided to the system Heretofore, a variety of engines and refrigerators related to the Stirling cycle have been developed. These include Stirling refrigerators, Ericsson engines, orifice pulse-tube refrigerators, standing-wave thermoacoustic engines and refrigerators, free-piston Stirling engines and refrigerators, and thermoacoustic-Stirling hybrid engines and refrigerators. Combinations thereof, such as the Vuilleumier refrigerator and the thermoacoustically driven orifice pulse tube refrigerator, have provided heat-driven refrigeration.

With the production ban of chlorofluorocarbons (CFC's), the interest in thermoacoustics has accelerated rapidly. For example, thermoacoustic refrigerators can be constructed such that they use only inert gases, which are non-toxic and do not contribute to ozone depletion, nor to global warming. Exemplary thermoacoustic engines and refrigerators are disclosed in U.S. Pat. Nos. 4,398,398; 4,489,553, 4,722,201, 5,303,555, 5,647,216, 5,953,921, 6,032,464, and 6,314,740, the contents of which are hereby incorporated by reference.

In a traditional Stirling engine, for example, high-temperature heat is added to the engine at a hot heat exchanger, and ambient-temperature waste heat is removed from the engine at an ambient heat exchanger. A solid matrix (also known as a regenerator) containing small pores having gas therein smoothly spans the temperature difference between the hot heat exchanger and the ambient heat exchanger. The temperature gradient across the regenerator provides the conditions for generation of gas oscillations within the pores, thus converting the heat entered at the hot heat exchanger into acoustic power. The gas in the pores of the regenerator moves toward the hot heat exchanger while the pressure is high and toward the ambient heat exchanger while the pressure is low. The oscillating thermal expansion and contraction of the gas, attending its oscillating motion along the temperature gradient in the pores, is therefore temporally phased with respect to the oscillating pressure so that the thermal expansion occurs while the pressure is high and the thermal contraction occurs while the pressure is low.

SUMMARY OF THE INVENTION

According to an aspect of some embodiments of the present invention there is provided a method for converting energy. The method comprises receiving energy from an external source, using the received energy for inducing a mass exchange process to release thermodynamic energy, and converting the thermodynamic energy directly into electrical energy at sufficient amount for performing work therewith.

According to an aspect of some embodiments of the invention there is provided a method of converting energy. The method comprises contacting a gaseous medium with a non-gaseous medium to increase concentration of a first substance in the gaseous medium and to release energy, directly converting a portion of the released energy to a pressure wave, and converting mechanical energy constituted by the pressure wave to non-mechanical energy.

According to some embodiments of the invention increasing the concentration and converting the portion of the released energy comprises forming a concentration gradient across a section of an acoustic resonator containing the gaseous medium and maintaining flux of the first substance along the gradient.

According to some embodiments of the invention the method comprises forming also a temperature gradient across the section of the resonator.

According to an aspect of some embodiments of the present invention there is provided a system for converting energy. The system comprises an acoustic resonator; a phase-exchange device configured for forming across a section of the resonator a concentration gradient in a gaseous medium contained by the resonator, to thereby generate a pressure wave within the resonator; and a conversion device for converting mechanical energy constituted by the pressure wave to non-mechanical energy.

According to some embodiments of the invention the system comprises a first heat-exchanger and a second heat-exchanger being at different temperatures and in thermal communication with opposite sides of the section of the resonator for forming also a temperature gradient across the section.

According to some embodiments of the invention the non-mechanical energy comprises electrical energy.

According to an aspect of some embodiments of the present invention there is provided a system for generating electricity comprising the energy conversion system as delineated hereinabove.

According to an aspect of some embodiments of the present invention there is provided a method of distributing electricity comprising executing the method as delineated hereinabove and distributing the electrical energy.

According to some embodiments of the invention the electrical energy is distributed over a grid-connected region.

According to some embodiments of the invention the electrical energy is distributed to an off grid location.

According to some embodiments of the invention the non-mechanical energy comprises thermal energy.

According to some embodiments of the invention a fluid corresponding to the first substance is introduced into the resonator repeatedly or continuously to generate the pressure wave.

According to some embodiments of the invention the fluid is introduced into the resonator between a pressure node and a velocity node of the pressure wave.

According to some embodiments of the invention the section of the resonator is occupied by a sorbent medium wherein the concentration of the first substance in the medium is varied when the medium flows through the sorbent medium.

According to some embodiments of the invention the sorbent medium is contained in a porous stack.

According to some embodiments of the invention the fluid is in a non-gaseous state.

According to some embodiments of the invention excess fluid is evacuated from the resonator at or near a pressure node of the pressure wave.

According to some embodiments of the invention the conversion of the mechanical energy is by a linear alternator.

According to some embodiments of the invention the conversion of the mechanical energy is devoid of moving parts.

According to some embodiments of the invention the conversion of the mechanical energy is by a capacitor, wherein the pressure wave dynamically varies an electrical capacitance of the capacitor.

According to some embodiments of the invention the conversion of the mechanical energy is by a thermoacoustic heat pump.

According to an aspect of some embodiments of the present invention there is provided a method of refrigeration. The method comprises executing the method as delineated hereinabove and using the heat pump for refrigeration.

According to an aspect of some embodiments of the present invention there is provided a refrigeration system, which comprises the energy conversion system as delineated hereinabove.

According to an aspect of some embodiments of the present invention there is provided a method of generating electrical current. The method comprises forming a concentration gradient of a first substance in a gaseous medium within a charged capacitor, so as to vary an electrical capacitance of the capacitor in an oscillatory manner; and extracting oscillatory current generated by the variation in the capacitance.

According to some embodiments of the invention the capacitor comprises a sorbent medium selected for varying the concentration of the first substance, wherein the forming the gradient comprises introducing the gaseous medium in a state of reduced or zero content of the first substance into the capacitor.

According to an aspect of some embodiments of the present invention there is provided a system for generating electrical current. The system comprises a charged capacitor under generally constant voltage and/or having generally constant electrical charge; a source of a first substance for forming a concentration gradient of the first substance in a gaseous medium within the capacitor, to vary an electrical capacitance of the capacitor in an oscillatory manner; and electric circuitry configured for extracting oscillatory current generated by the variation in the capacitance.

According to some embodiments of the invention the vapor source is a sorbent medium within the capacitor.

According to some embodiments of the invention the first substance is water vapor.

According to some embodiments of the invention the gaseous medium comprises air and water vapor.

According to some embodiments of the invention the first substance is other then water vapor.

According to an aspect of some embodiments of the present invention there is provided a method of material separation. The method comprises introducing a fluid medium having at least a first substance and a second substance into an acoustic resonator; generating a pressure wave in the resonator, to form within the resonator a region of high concentration of the first substance and a region of low concentration of the first substance; and from the region of high concentration, extracting the first substance out of the resonator, thereby separating at least the first substance from the fluid medium.

According to some embodiments of the invention the method further comprises storing at least the first substance separated from the fluid medium, thereby storing a phase-separation energy; and using the first substance for converting the phase-separation energy at a later time.

According to an aspect of some embodiments of the present invention there is provided a system for material separation. The system comprises an acoustic resonator configured for receiving a fluid medium of at least a first substance and a second substance; a pressure wave driver for generating a pressure wave in the resonator, to form within the resonator a region of high concentration of the first substance and a region of low concentration of the first substance; and a fluid extraction member, configured for extracting the first substance from the region of high concentration out of the resonator.

According to some embodiments of the invention the pressure wave source comprises a thermoacoustic engine.

According to some embodiments of the invention the system comprises at least one storage container for storing at least the first substance separated from the fluid medium, thereby to store a phase-separation energy; and an energy conversion system for converting the phase-separation energy.

According to some embodiments of the invention the resonator is partially occupied by a sorbent medium wherein the regions of high and low concentrations of the first substance are formed within the sorbent medium.

According to some embodiments of the invention the sorbent medium is selective for the first substance, and has inert relations with any other species in the fluid medium.

According to some embodiments of the invention the first substance is water vapor.

According to some embodiments of the invention the fluid medium comprises air and water vapor.

According to some embodiments of the invention the first substance is other then water vapor.

According to an aspect of some embodiments of the present invention there is provided a method of material separation. The method comprises introducing a fluid medium having at least a first substance and a second substance into an electrical system; and applying voltage to the electrical system to form an electric field being sufficient for inducing sorption of at least the first substance within the electrical system, thereby separating at least the first substance from the fluid medium.

According to an aspect of some embodiments of the present invention there is provided a thermoacoustic system. The system comprises a resonator having therein at least one thermoacoustic unit under a temperature gradient; and a phase-exchange device configured for forming across the thermoacoustic unit a concentration gradient of a first substance in gaseous medium contained by the resonator.

According to some embodiments of the invention the at least one thermoacoustic unit is selected from the group consisting of a regenerator engine unit, a stack engine unit, a regenerator refrigerator unit, and a stack refrigerator unit.

According to an aspect of some embodiments of the present invention there is provided a system for converting energy. The system comprises a resonator having therein at least one wet thermoacoustic engine under a temperature gradient, and a charged capacitor under generally constant voltage and/or having generally constant electrical charge, wherein the wet thermoacoustic engine is configured for generating a pressure wave within the resonator, hence also to vary an electrical capacitance of the capacitor in an oscillatory manner; and electric circuitry configured for extracting oscillatory current generated by the variation in the capacitance.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
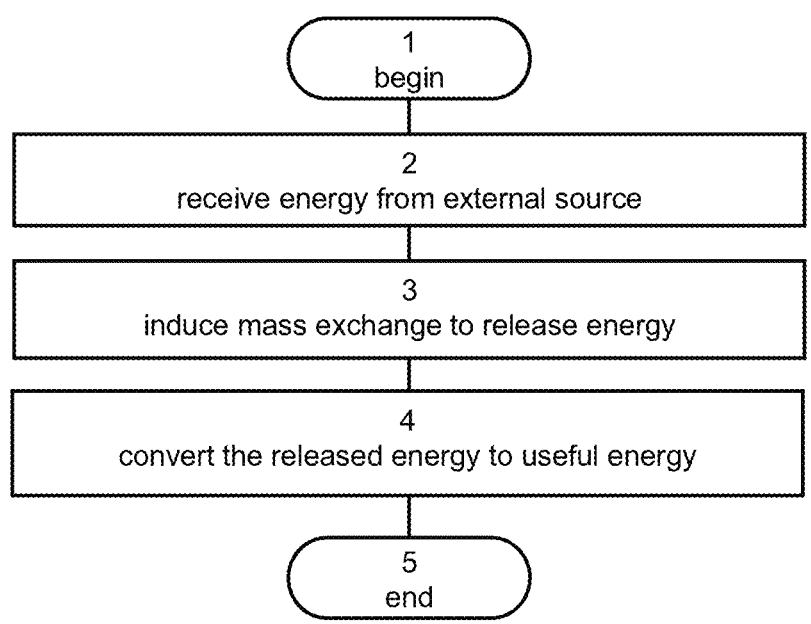
FIG. 1 is a flowchart diagram describing a method suitable for converting energy, according to some embodiments of the present invention.

The present invention, in some embodiments thereof, relates to renewable energy, and, more particularly, but not exclusively, to a system and method for energy conversion based on phase-exchange processes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have discovered an energy conversion technique which utilizes the energetic variations which a gaseous medium undergoes when the relative concentration of one or more gases is increased or decreased within the medium. For example, it was found by the present inventors that the energy released upon increasing the vapor content of the gaseous medium can be converted and utilized by an external load. Conversely, the present inventors found that mechanical energy or electrical can be utilized for separating one or more gases from the gaseous medium.

In some embodiments of the present invention the technique relates to the formation of a pressure wave (e.g., an acoustic wave) within the gaseous medium. The pressure wave can be a generally standing wave or a traveling wave, as desired. In some embodiments, the energy required for forming the pressure wave originates from energy that is released upon increasing the concentration of a particular gas in the gaseous medium. In some embodiments of the present invention the energy required for forming the pressure wave originates from an external source.

In some embodiments of the present invention the energy is converted without generating a pressure wave. For example, radiation and/or thermal energy can be utilized to induce variations in the relative concentration of a substance within a medium. The energy difference in these variations is directly utilized in accordance with some embodiments of the present invention for generating electrical energy.

Referring now to the drawings, FIG. 1 is a flowchart diagram describing a method suitable for converting energy, according to some embodiments of the present invention.

The method begins at 1 and continues to 2 at which energy is received from an external source. The method continues to 3 at which the received energy is used for inducing a mass exchange process.

As used herein, "mass exchange" refers to a process in which there is a flow of a mass of a particular substance from a first phase to a second phase, wherein the first phase is different from the second phase. The first and second phases can be any thermodynamic phases, including, without limitation, a gas phase and a non-gaseous phase, a liquid phase and a solid phase, and the like.

The method then proceeds to 4 at which the thermodynamic energy that is released in the mass exchange process is converted into useful energy, for example, energy that is useable for performing work, such as electrical or mechanical energy. The method ends at 5.

Figure 2:
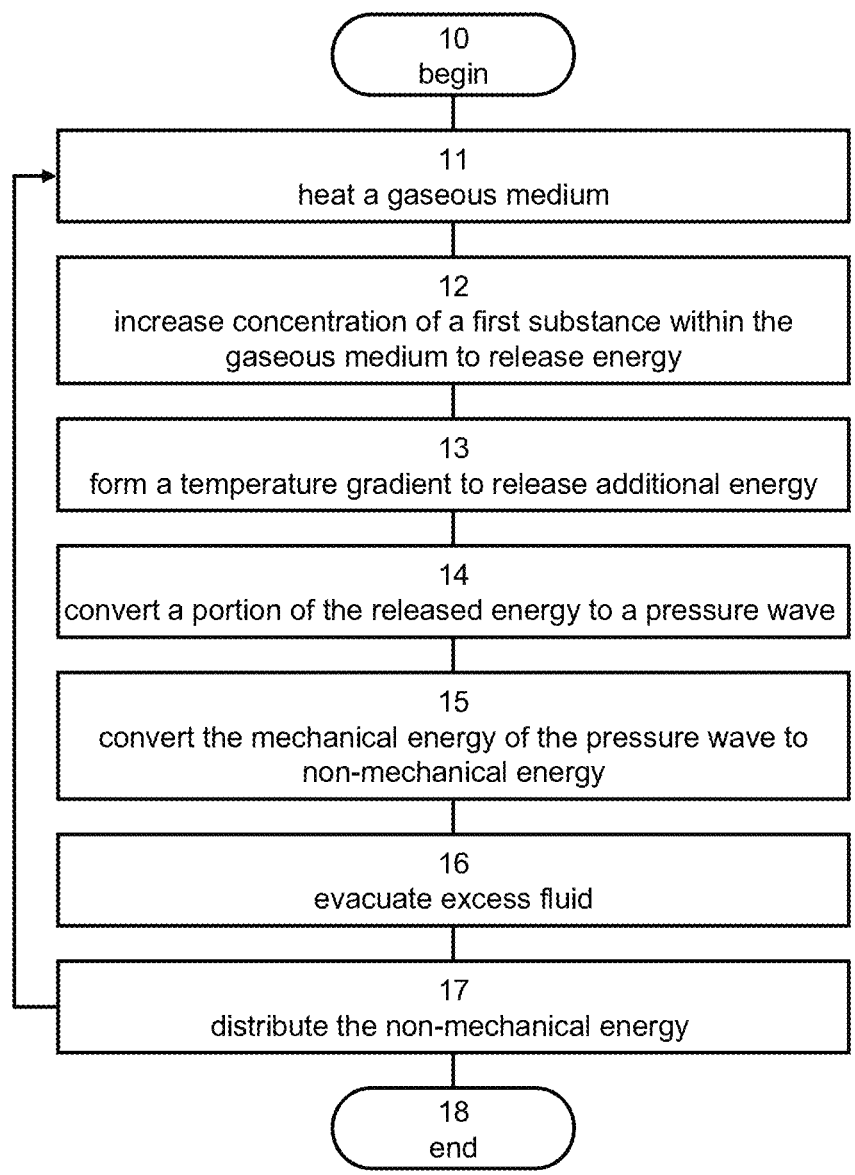
FIG. 2 is a flowchart diagram describing a method suitable for converting energy via a pressure wave, according to some embodiments of the present invention.

FIG. 2 is a flowchart diagram describing the method in embodiments in which mass exchange between a gaseous phase and a non-gaseous phase is converted to mechanical energy. The method begins at 10 and continues to 12 at which the concentration of a first substance in a gas phase within a gaseous medium is increased so as to release energy. Optionally, 12 is preceded by 11 at which the gaseous medium is heated. The concentration is typically increased by establishing interaction between the gaseous medium and a non-gaseous medium, and more particularly interaction between molecules of the first substance in its gas phase within the gaseous medium with molecules of the first substance in non-gas phase (condensed or sorbed) within the non-gaseous medium. Thus, the first substance serves as a reactive component in the gas and non-gas media and is therefore interchangeably referred to herein as "reactive substance."

Below, the terms "first gas" and "reactive gas" will be used, interchangeably, to describe the reactive substance when it is in its gas phase.

While the embodiments below are described using the singular form "reactive substance," it is to be understood that it is not intended to limit the scope of the invention to the use of only one reactive substance within the gaseous and non-gaseous media. Thus, some embodiments of the present invention contemplate use of two or more reactive substances.

The reactive substance(s) can be of any type that releases a sufficient amount of energy when its mass concentration or partial pressure in its gas phase is increased. An example is water vapor. When water vapor is added to a gaseous medium, such as, but not limited to, air of reduced humidity, energy is released. Generally, any material that can coexist in gaseous and non-gaseous phases within the range of operating temperatures and pressures can serve as a source for the reactive substance. Representative examples include, without limitation, molecular sieves (e.g., zeolite or the like), activated carbon, silica gel and carbon-nanotubes as solid sorbent materials. Also contemplated, is the use of a hygroscopic salt solution, such as, but not limited to, LiBr as a sorbent medium, particularly for the case of water vapor.

Other liquid-gas pairs suitable for the present embodiments, include, without limitation, aqueous solution of $(NH_4)_2CO_3$ (ammonium-carbonate) and its gas phase (ammonia and carbon dioxide).

Aside from the reactive substance(s) the gaseous medium optionally and preferably also include one or more other types of gases which remain in their gaseous phase and do not experience phase change when contacting the non-gaseous medium. These gases are referred to below as non-reactive gases. It is to be understood that it is not necessary for the non-reactive gas to be a noble gas (although noble gases are not excluded from the scope of the present invention), since any gas that does not experience phase change while contacting the non-gaseous medium can serve as the non-reactive gas. Representative examples for non-reactive gases suitable for the present embodiments include, without limitation, air, nitrogen, helium, neon, argon, krypton and xenon.

A physical system which includes gaseous as well as non-gaseous phases of the same substance, wherein the gaseous phase is separated from the non-gaseous phase, constitutes a phase-separation energy which can be converted. The method of the present embodiments provides the gaseous and non-gaseous media separately from each other and converts their phase-separation energy by generating the conditions for the interaction between these media such that there is a mass-exchange, of the reactive substance(s), between the gaseous medium and the non-gaseous medium.

In various exemplary embodiments of the invention the mass exchange is a process in which increase in mass concentration or partial pressure of a substance in one phase is accompanied by, and is a direct consequence of, a decrease in mass concentration or partial pressure of the substance in another phase. Mass exchange can be a process in which increase in mass concentration or partial pressure of a gas phase substance is accompanied by, and is a direct consequence of, a decrease in mass concentration or partial pressure of the substance in its non-gaseous phase. Mass exchange can also be a process in which increase in mass concentration or partial pressure of a substance in its non-gaseous phase is accompanied by, and is a direct consequence of, a decrease in mass concentration or partial pressure of the substance in its gaseous phase. It is recognized that when the overall masses of the two phases differ, the amounts of change in mass concentration or partial pressure during also differ, and that in some cases the change mass concentration or partial pressure in one of the phases can be very small compared to the overall mass of the respective phase. Nevertheless, the mass exchange is defined as mass flow from one phase to the other, even if the change in mass concentration or partial pressure in one of the phases is too small to be detected.

Below, the term "bidirectional mass exchange" is used to describe a process in which part of the time there is an increase in the mass concentration or partial pressure of a gas phase substance due to a decrease in the mass concentration or partial pressure of the substance in its non-gaseous phase, and part of the time there mass exchange in the opposite direction, namely an increase in the mass concentration or partial pressure of the substance in its non-gaseous phase due to a decrease in the mass concentration or partial pressure of the substance in its gaseous phase.

When the mass concentration or partial pressure of the gas phase is increased, the reactive substance experiences a phase transition from a gaseous phase to a non-gaseous phase. This phase transition can be via condensation and/or sorption and/or deposition.

When the mass concentration or partial pressure of the gas phase is decreased, the reactive substance experiences a phase transition from a non-gaseous phase to a gaseous phase. This phase transition can be via evaporation, and/or desorption and/or sublimation.

The term "condensation" refers to the change of the physical state of matter from gaseous phase into liquid phase.

The term "sorption" refers to the process of absorption, adsorption or a combination thereof, and "desorption" refers to the respective converse process.

Any type of sorption is contemplated, including, without limitation, chemical sorption, electrostatic sorption, and physical sorption. Chemical sorption refers to sorption caused by covalent and hydrogen bonding of the solute to the non-gaseous medium, electrostatic sorption results from the attraction of charged molecules to the charged surface of the non-gaseous medium through ion-ion and ion-dipole forces, and physical sorption is a result of Van der Waals forces which consist of London dispersion forces and hydrophobic bonding. London forces are caused by rapidly fluctuating dipole and quadrupole moments resulting from the movement of electrons in their orbitals, and hydrophobic bonding is a result of thermodynamic gradients caused by the repulsion of the substance from the gaseous medium to the non-gaseous medium.

Thus, in various exemplary embodiments of the invention there is a phase-exchange between the gaseous medium and the non-gaseous medium, in which phase-exchange can be sorption of gas molecules into the non-gaseous medium and desorption of sorbed molecules into the gaseous medium. Specifically, the present embodiments contemplate absorption of molecules of the reactive gas into a liquid, desorption of absorbed molecules out of the liquid, adsorption of molecules of the reactive gas onto a solid, desorption of adsorbed molecules out of the solid, condensation of the reactive gas into a pure liquid phase and evaporation of a pure liquid phase to form the reactive gas.

In some embodiments of the present invention the phase-exchange is via sorption and desorption processes other than condensation of gas into a pure liquid and other than evaporation of pure liquid into vapor.

The non-gaseous medium can be of any type provided it can exchange mass with the gaseous medium, via any of the aforementioned mass exchange processes. Preferably, the method operates in the absence of equilibrium between the gaseous and non-gaseous phases of the reactive substance. This can be done selecting a non-gaseous medium having sufficient mass capacity to generate efflux of the reactive substance out of the gaseous medium.

In some embodiments of the present invention the mass exchange between the gaseous and non-gaseous media is in a selective manner, such that other substances in the gaseous medium remain in their gaseous phase.

Representative example of non-gaseous media suitable for the present embodiments include, without limitation, a jet of liquid droplets, an adsorbent solid, an absorbing liquid (e.g., a liquid film such as, but not limited to, a free-flowing liquid film), a saturated porous medium, and the like. The non-gaseous medium thus functions as a source/sink for exchanging mass with the gaseous medium.

Herein the term "sorbent medium" is used to define a material or structure that has the ability to condense, sorb or otherwise hold molecules of a substance or substances on its surface and/or the ability to capture molecule of the substance or substances, for example, through penetration of the molecules into its inner structure or into its pores. The term "selective sorbent medium" is used to define a sorbent material that condenses, sorbs or otherwise holds molecules of some substances, substantially without condensing, sorbing or otherwise holding molecules of other substances. Representative examples of sorbent media suitable for the present embodiments are provided hereinunder.

The effect of the phase exchange is configured in accordance with some embodiments of the present invention so as to perform work on the gaseous medium, and to form the pressure wave. This can be done in more than one way. In some embodiments of the present invention work is done via mass addition at or near a point of greatest compression which results in increased volume. In some embodiments of the present invention work is done via mass reduction at or near the point of greatest rarefaction which results in decreased volume. In some embodiments of the present invention work is done via latent heat absorption at or near the point of greatest rarefaction, thereby causing contraction at low pressure and performing work. In some embodiments of the present invention work is done via latent heat release at or near the point of greatest compression, thereby causing expansion at high pressure and performing work. Thus, in various exemplary embodiments of the invention the reactive substance (in gaseous or liquid state) is introduced into the resonator repeatedly or continuously to generate the pressure wave.

Optionally and preferably, the method continues to 13 at which a temperature gradient is also formed across the section of the resonator so as to release additional energy, as known, for example, in the art of thermoacoustics.

The method continues to 14 at which a portion of the released energy is directly converted to a pressure wave. An exemplified procedure for converting the released energy into a pressure wave is by forming a concentration gradient and maintaining non-zero time-averaged flux of the reactive gas along the concentration gradient (from high to low concentration). It was found by the present inventors that such gradient and flux can serve as an energy source for promoting fluctuations within the gaseous medium, which fluctuations ensure instabilities and result in the formation of a pressure wave. In calculations performed by the present inventors it was discovered that the average acoustic power flow per unit volume in a gaseous medium containing a mixture of gases increases with the relative pressure of a gas component (e.g., vapor pressure) within a gaseous medium. More details regarding the discovered phenomenon are provided in the Examples section that follows.

The thermodynamic process can be better understood from the following non-limiting example with reference to FIGS. 2A and 2B. While the present example is described with a particular emphasis to vapor, such as a water vapor, it is to be understood that more detailed reference to vapor is not to be interpreted as limiting the scope of the invention in any way.

Consider a representative gas "parcel" during one oscillation period of a pressure wave. Consider firstly a standing pressure wave, wherein the pressure and displacement are in phase. In this case, the parcel experiences pressure changes as it is being displaced by the pressure wave. These pressure changes are accompanied by temperature changes, wherein expansion is accompanied with cooling and compression is accompanied with heating.

In the present example, the parcel is in contact with a source of vapor effecting phase change from a gaseous phase to a non-gaseous phase and vice versa. The driving force to the pressure wave is the concentration difference which induces either sorption or desorption.

Figure 3A:
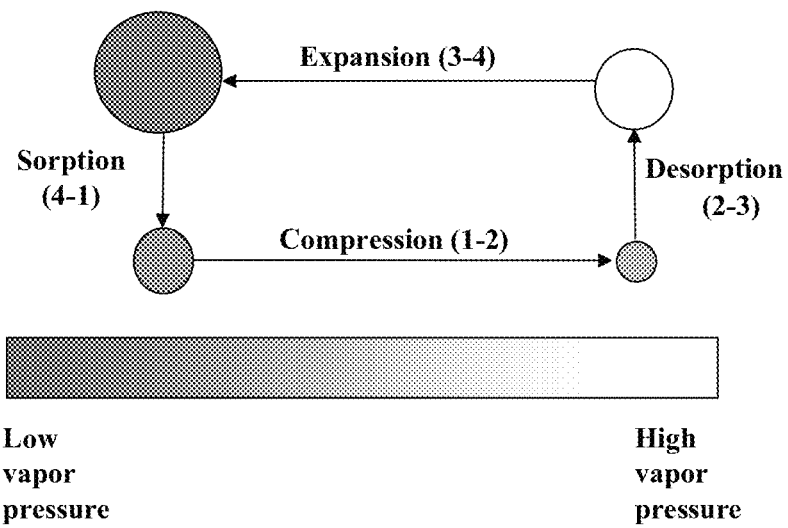
FIGS. 3A-3B are diagrams exemplifying, in a simplified manner, a thermodynamic process employed in some embodiments of the present invention for energy conversion.
Figure 3B:
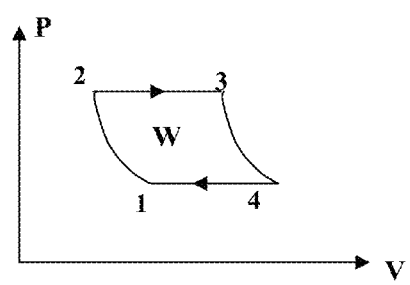

FIG. 3A illustrates one thermodynamic cycle experienced by the parcel of the present example, and FIG. 3B illustrates the corresponding P-V diagram. The parcel is first displaced and compressed (see transition 1-2 in FIGS. 3A-3B). Due to the vapor pressure gradient, its vapor pressure is lower than the local vapor pressure, despite the compression. This induces desorption resulting in expansion against the high pressure (transition 2-3). Next, the parcel is displaced and expanded by the pressure wave (transition 3-4). Despite the expansion, its vapor pressure is still higher than the local equilibrium vapor pressure, which incurs sorption and contraction at low pressure (transition 4-1). The expansion and contraction, occurring during the high and low pressure segments, respectively, re-enforce and amplify the pressure wave, producing net work, in analogy to the Rankine cycle.

It is to be understood that the above description is for illustrative purposes and should be construed as limiting the scope of the present invention to a process and system which employ idealized standing pressure wave. The process and system according to some embodiments of the present invention are operative when the pressure wave is not a pure standing wave, namely a standing wave for which the phase difference between the pressure and displacement is small but not zero.

As used herein the term "generally standing pressure wave" refers to a pressure wave for which the phase difference between the pressure and displacement in less than $0.1\pi$ or less than $0.09\pi$ or less than $0.08\pi$ or less than $0.07\pi$ or less than $0.06\pi$ or less than $0.05\pi$ or less than $0.04\pi$ or less than $0.03\pi$ or less than $0.02\pi$ or less than $0.01\pi$.

Consider secondly a traveling wave in which the pressure and the velocity are in phase. In this case, the cycle becomes analogous to the Stirling cycle, as will now be explained. The pressure and displacement are now out of phase, and the gas parcel is first displaced and then compressed/expanded. In a traveling wave system the sorbent medium and the gas are preferably is close contact relationship such that the characteristic length scale across a pore is much smaller than the diffusive length scale during an oscillation cycle. This close contact ensures that during its displacement, the parcel maintains its local equilibrium with the sorption medium (this is analogous to the regenerator in a Stirling engine). Suppose that the parcel is first displaced to a region of low concentration. Since it follows the local equilibrium partial pressure, it has expanded during its displacement. It is then compressed by the pressure wave, performing work at low pressure. The parcel is then displaced to a region of high concentration, during which it is compressed. It is then expanded by the pressure wave, again performing work. An advantage of this cycle is that the expansion and compression achieved during the displacement are very close to equilibrium, so that irreversibilities and losses incurred by steep gradients are reduced or avoided.

Thus, the present embodiments successfully form a pressure wave by varying the relative concentrations of the gas components in the gaseous medium. Referring again the FIG. 2, the method continues to 15 at which the mechanical energy constituted by the pressure wave is converted to non-mechanical energy.

The inventors of the present invention contemplate many types of non-mechanical energy. In some embodiments of the present invention the non-mechanical energy comprises electrical energy. The pressure wave can be used for generating electrical energy in more than one way. In some embodiments of the present invention the pressure wave establishes motion in an alternator, e.g., a linear alternator, which converts mechanical motions to electrical current, e.g., by way of induction as known in the art. In some embodiments of the present invention the energy of the pressure wave is converted into electrical energy by varying the capacitance of an electrical capacitor system in a manner that will now be explained.

Capacitance is a physical observable, attributed to a conductor or a system of conductors, which observable may be electrostatically defined as the ratio between a change in the electric charge on the conductor and the potential drop resulting from that change. The capacitance, C, of a capacitor system depends on its geometry and on dielectric materials, if present, which are adjacent to the conducting components of the capacitor. For example, for a parallel-plate capacitor the capacity is proportional to the area of the plates, and to the dielectric coefficient of the dielectric material and it is inversely proportional to the distance between the plates. A change in capacitance may therefore be achieved by varying the dielectric coefficient.

Thus, according to some embodiments of the present invention the pressure wave is brought into a capacitor system, wherein the variations in relative concentrations of the gas components of the gaseous medium, via the aforementioned phase-exchange process, result in a change in the dielectric coefficient of the capacitor system. This, in turn, results in capacitance variations which are converted in accordance with some embodiments of the present invention into electrical current, by connecting the capacitor system to a circuitry and ensuring that the charge on the capacitor system or the voltage across the capacitor system is constant. Since the charge q equals voltage V times the capacitance C, a time-varying capacitance, dC/dt, results in a current, dq/dt, when the voltage is constant, or vice versa.

An aspect of some embodiments of the present invention therefore concerns with a method suitable for generating electrical current, by forming a concentration gradient of the reactive substance in the gaseous medium within a charged capacitor system along a longitudinal direction (generally perpendicularly to the direction of the electric field lines within the capacitor system), to vary an electrical capacitance of the capacitor system in an oscillatory manner, and extracting oscillatory current generated by the capacitance variation. This process can, in principle, be reversed, wherein application of voltage, for example, alternating voltage, across a capacitor system results in mass exchange between the capacitor system and a reactive medium within the capacitor. A procedure directed to this embodiment of the present invention is described in greater details below (see, e.g., FIG. 7 and the accompanying description).

Also contemplated are embodiments in which the mechanical energy of the pressure wave is converted to electrical energy via the piezoelectric effect.

In some embodiments of the present invention the non-mechanical energy comprises thermal energy. For example, the generated pressure wave can be used as a mechanical driving force in a thermoacoustic heat pump. Representative thermoacoustic heat pumps suitable for the present embodiments are found, for example, in U.S. Pat. Nos. 7,263,837, 6,804,967 and 6,688,112, and in U.S. Published Application Nos. 20100172213 and 20090268556, the contents of which are hereby incorporated by reference.

In various exemplary embodiments of the invention the conversion of mechanical energy is devoid of moving parts. This can be achieved for example, by converting the energy directly to electrical energy using the capacitor system, or directly into thermal energy using thermoacoustic heat pump, as described above. Other techniques are not excluded from the scope of the present invention.

In various exemplary embodiments of the invention the method continues to 16 at which excess fluid is evacuated. The fluid can be evacuated at or near a pressure node of the pressure wave. The evacuated fluid is optionally and preferably in gaseous phase and includes higher concentration of the reactive substance compared to the gaseous medium received by the method. Thus, the method of the present embodiments receives a gaseous medium separately from a non-gaseous medium, wherein the concentration the reactive substance is higher in non-gaseous medium than in the gaseous medium, and provides a mixture with elevated concentration of the reactive substance through port. At least some of the energy difference between the energy of the input and the energy of the output is converted by the method to a pressure wave and thereafter to non-mechanical energy.

The method optionally and preferably continues to 17 at which the non-mechanical energy is distributed. For example, electrical energy can be distributed over a grid in grid-connected regions for generating distributed electricity, or locally to one or more off-grid such as, but not limited to, rural regions, developing countries. Off-grid applications include, but are not limited to, telecommunications, village water and irrigation pumping, and specialized power sources, such as small home systems.

In various exemplary embodiments of the invention the method loops back to 11 or 12 to perform multiple cycles of energy convention.

The method ends at 18.

The method of the present embodiments can be used in various applications. Generally, when the mechanical energy of the pressure wave is converted into electrical energy, the method can be utilized for powering any electrically driven appliance, either directly or via an electrical energy distribution system which distributes the energy over a grid-connected region or off-grid region. For example, the method of the present embodiments can be utilized for refrigeration or climate control, whereby the electrical energy is delivered to a refrigeration or climate control system for performing the refrigeration or climate control.

The method of the present embodiments can also be utilized substantially without using electrical energy. Specifically, when the non-mechanical energy provided by the method is other than electrical energy, this energy can be directly utilized for powering a suitable appliance system. A representative example of such system is a thermoacoustic heat pump, such as one of the thermoacoustic heat pumps cited above. In these embodiments, the pressure wave can be utilized, for example, for transporting thermal energy over a thermal stack from a cold side of the stack to a hot side of the stack, thereby achieving refrigeration.

Figure 4A:
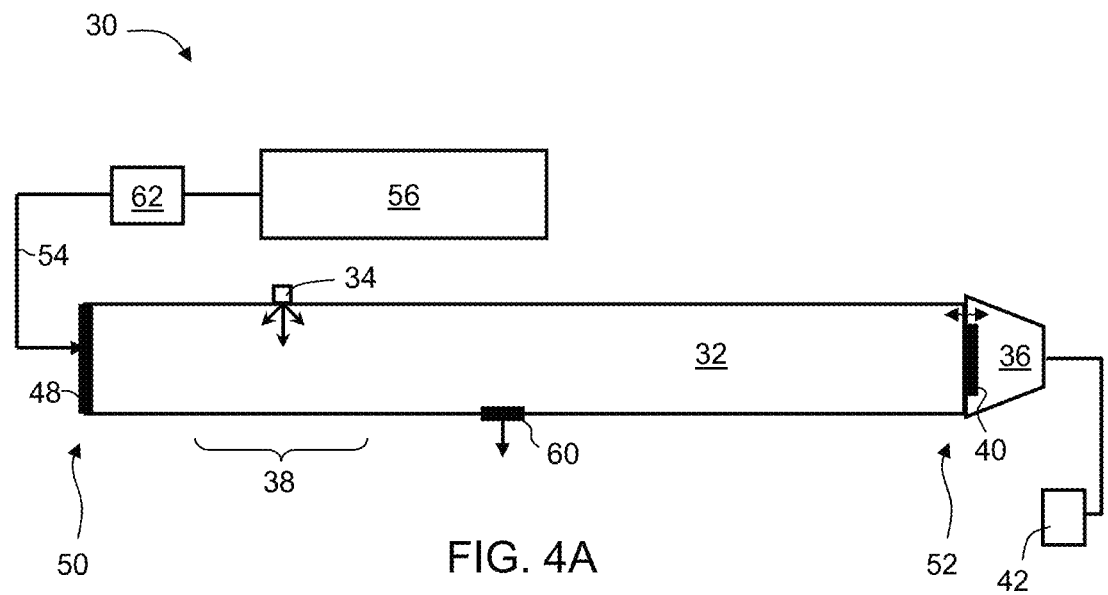
FIGS. 4A-4C are schematic illustrations of a system for converting energy, according to various exemplary embodiments of the present invention.
Figure 4B:
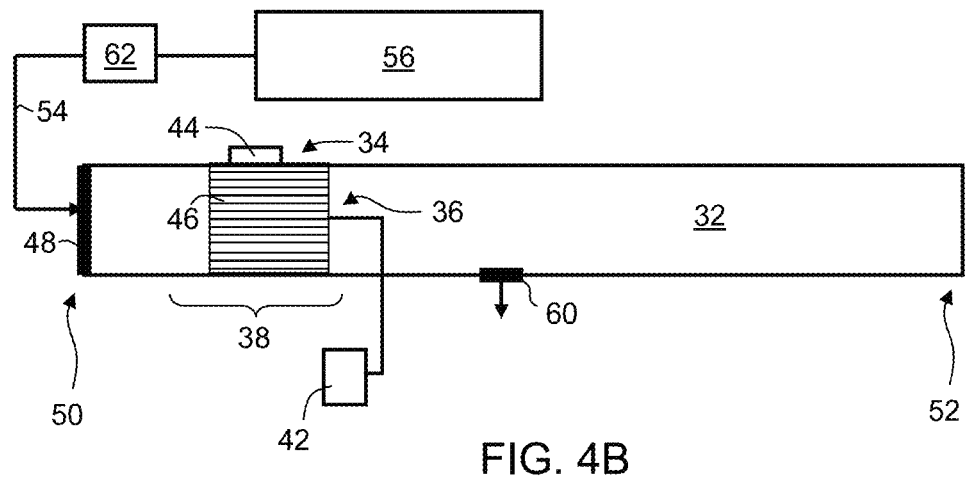

Reference is now made to FIGS. 4A and 4B which are schematic illustrations of a system 30 for converting energy, according to various exemplary embodiments of the present invention. System 30 can be used, for example, for executing one or more of the operations of the method described above with respect to FIG. 2. System 30 comprises an acoustic resonator 32 having a first end 50 and a second end 52, a phase-exchange device 34 and a conversion device 36. Phase-exchange device 34 forms across a section 38 of resonator 32 a longitudinal concentration gradient, a gaseous medium contained by resonator 32, to thereby generate a pressure wave within resonator 32. The location of phase-exchange device 34 may vary depending on the specific design of the system, for example, choice of working fluids, resonant frequency, pressure amplitude and other parameters. In some embodiments, device 34 is located about half way between a pressure and a velocity node of the generally standing wave.

Resonator 32 is shaped as a tube, preferably of a generally round (e.g., circular) cross-section. Optionally and preferably, the diameter of resonator 32 is selected sufficiently small such that for any plane perpendicular to the longitudinal axis of resonator 32, the time-averaged temperature and density are generally uniform (e.g., within 10%) across that plane. Resonator 32 can be made of any material. Preferably, the material has sufficiently high heat capacity such that the temperature at the wall of the resonator does not oscillate or oscillate at low amplitude (e.g., amplitude of less than 10° C. or less than 5° C. or less than 2° C. or less than 1° C.).

Typical dimensions of resonator 32 are from a few centimeters or less to a few meters.

Phase-exchange device 34 can be embodied in many forms. Broadly speaking, phase-exchange device 34 generates an influx of the reactive substance into the resonator. The influx can be continuous or intermittent, as desired.

In the representative illustration of FIG. 4A, which is not to be considered as limiting, phase-exchange device 34 is an aerosol device or an atomizer, which supplies the reactive substance in the form of a get of droplets of, shown as a bundle of arrows. When a gaseous medium flows through the droplets, a concentration gradient of the reactive gas is formed across section 38, thereby generating a pressure wave as further detailed hereinabove and in the Examples section that follows. Phase-exchange device 34 provides liquid droplets of many types of liquids, including, without limitation, water, saline water, ammonium-carbonate solution and commercially available organic refrigerants.

In the representative illustration of FIG. 4B, phase-exchange device 34 supplies the reactive substance to a sorbent medium 46 within resonator 32, such that the reactive substance is sorbed onto sorbent medium 46. In this embodiment, the concentration of the reactive gas in the gaseous medium is varied when the gaseous medium flows through sorbent medium 46. The reactive substance is supplied to the sorbent medium by a supply element 44, which may be, for example, an injector, a wick, a dripping faucet or the like.

Sorbent medium 46 can be deposited on the walls of resonator 32, or it can be provided in a form of a stack medium.

The term "stack medium", as used herein, refers to a solid structure having a multitude of internal surfaces separated by gaps. In various exemplary embodiments of the invention the stack medium has a specific surface area which is at least 500 $m^2$/gr and an acoustic resistance which is less than 20 Pa/(m/s) at a frequency of 100 Hz.

Representative examples of stack media suitable for the present embodiments include, without limitation, a honeycomb medium, an arrangement of generally parallel plates, an arrangement or of tubes, a random porous medium, a nanostructure medium which includes a plurality of deposited or grown nanostructures, e.g., carbon nanotubes, and the like. The sorbent medium can be deposited on the surfaces of the stack medium or the stack medium itself can be made sorbent.

Conversion device 36 serves for converting mechanical energy constituted by the pressure wave to non-mechanical energy, and can be therefore embodied in many forms.

In some embodiments of the present invention, conversion device 36 is an alternator (e.g., a linear alternator) having a moving member 40, such as a membrane or the like. Device 36 can be located at end 52 of resonator 32.

Device 36 receives the pressure wave and converts it first to a motion of member 40 and thereafter to electrical energy, typically by means of electromagnetic or electrostatic induction. For example, device 40 can operate according to the principle of an acoustic microphone, such as, but not limited to, a dynamic microphone the moving member 40 is coupled to a coil placed in a magnetic field; a capacitive microphone, wherein moving member 40 is coupled to a capacitor plate, and ribbon microphone wherein the membrane is made of an electrically conductive foil (e.g., metal foil) placed in a magnetic field, as known to those ordinarily skilled in the art of electroacoustic transducers. Also contemplated are embodiments in which the mechanical energy of the pressure wave is converted to electrical energy via the piezoelectric effect. In these embodiments, device 40 comprises a piezoelectric crystal which generates alternating voltage in response to the pressure oscillations.

In some embodiments of the present invention conversion device 36 is devoid of any moving parts. For example, conversion device 36 can be embodied as a capacitor system which receives the pressure wave which generates variations in the dielectric coefficient of the capacitor system, and therefore also variations in the capacitance. The capacitance variations are converted into electrical current as further detailed hereinabove. The capacitor system can be placed anywhere within resonator 32. Preferably, the capacitor system is placed at section 38.

In the exemplary embodiment that is illustrated in FIG. 4B the stack itself serves as a capacitor system. In this embodiment, the stack is preferably made of an electrically conductive material so as to facilitate its function as a capacitor system. For example, the stack can be made of deposited or grown nanostructures which effect an overall capacitance that is substantially sensitive to the partial gas pressure. Thus, the pressure oscillations result in considerable changes in the capacitance, and the energy conversion is more efficient. As a representative example, for a capacitor system made of carbon nanotubes, the capacitance per unit area is about 75 $nF/cm^2$ at relative humidity of about 60%, about 310 $nF/cm^2$ at relative humidity of about 70% and more than 20 $\mu F/cm^2$ at relative humidity of about 85%.

The electrical energy that is generated by device 36 is utilized by a load or circuitry generally shown at 42.

An aspect of some embodiments of the present invention thus concerns with a system for generating electrical current, which comprises a charged capacitor system under generally constant voltage and/or having generally constant electrical charge; a source of a reactive substance for forming a concentration gradient of the reactive substance within the capacitor, to vary an electrical capacitance of capacitor in an oscillatory manner; and electric circuitry which extracts oscillatory current generated by the variation in capacitance.

System 30 is configured for receiving the gaseous and non-gaseous media separately from each other and converting their phase-separation energy via the aforementioned bidirectional mass-exchange process. The non-gaseous medium is provided by device 34 as further detailed hereinabove. The gaseous medium is preferably provided into resonator 32 through an inlet port 48 which can be located, for example, at an end 50 of resonator 32. Inlet port 48 can be an orifice of any shape, or a perforated plate, or the like. The gaseous medium is optionally and preferably guided into inlet port 48 by means of a conduit 54.

System 30 optionally and preferably comprises an outlet port 60 for evacuating excess fluid from resonator 32. The evacuated fluid is illustrated by an arrow near 60. The evacuated fluid is optionally and preferably in gaseous phase and includes higher concentration of the reactive substance compared to the gaseous medium entering resonator through inlet port 48. Thus, resonator 32 receives, on input, a gaseous medium of reduced concentration or devoid of the reactive substance through port 48, and non-gaseous medium of elevated concentration of the reactive substance from device 34; and provides, on output, a mixture with elevated concentration of the reactive substance through port 60. At least some of the energy difference between the energy of the input and the energy of the output is converted by system 30 to a pressure wave and thereafter to non-mechanical energy. Port 60 is preferably located at the wall of resonator 32 between a pressure node and a velocity node of the pressure wave.

In some embodiments of the present invention system 30 comprises a heating mechanism 56, configured for heating the gaseous medium prior to its entry into resonator 32. The advantage of these embodiments is that when elevated temperatures increase the efficiency of mass-exchange, hence also the efficiency of energy conversion. Heating mechanism 56 can be of any type, including, without limitation, a solar collector, an ohmic heater, a radioactive heater, a radiofrequency heater, microwave heater. Heating mechanism 56 can also be a heat reservoir.

System 30 can optionally and preferably comprise a separation mechanism 62 for removing the reactive substance from the gaseous medium prior to the entry of the gaseous medium into resonator 32. In embodiments in which system 30 comprises both heating mechanism 56 and separation mechanism 62, they can be positioned in any relation with respect to each other. Specifically, the gaseous medium can be heated before or after passing through separation mechanism 62. Separation mechanism 62 can be a passive mechanism operating according to the principle of diffusion. A representative example is brine which is useful when the reactive substance is water. Also contemplated, are embodiments in which separation mechanism 62 is an energy driven mechanism which actively reduces the concentration of the reactive substances from the gaseous medium. One example for such mechanism is a dehumidifier. Another example suitable for the present embodiments is the use pressure wave for material separation, as described hereinafter.

Figure 4C:
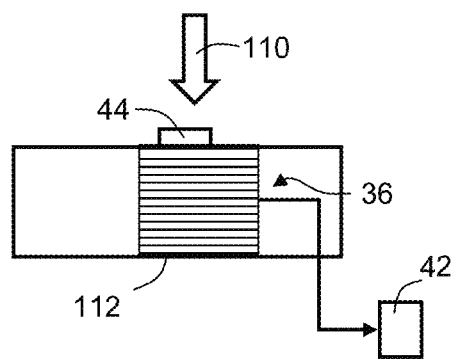

FIG. 4C is a schematic illustration of system 30 in embodiments of the invention in which the released energy is converted directly into electrical energy. These embodiments are particularly useful when system 30 serves as a solar cell or as a component thereof.

System 30 receives energy 110, for example, solar radiation or heat from an external source (not shown). Capacitor system 36 comprises a material that experiences phase transition responsively to the relieved energy. For example, capacitor system 36 can comprise a substance in liquid phase that is evaporated by the heat received from the external source. The phase transition is accompanied by mass exchange between the two phases (for example, between the liquid and gaseous phase), resulting in capacitance variations within capacitor system 36. The capacitance variations are converted into electrical current as further detailed hereinabove. System 30 preferably comprises a phase return medium 112 which may be in the form of a plate or heat sink. Medium 112 serves for completing the thermodynamic cycle. For example, when the mass exchange includes evaporation of liquid, medium 112 can condense the vapors back into the liquid phase. The electrical energy that is generated by capacitor system 36 is utilized by load or circuitry 42.

Following is a description of a technique which utilizes a pressure wave for material separation according to some embodiments of the present invention. Broadly speaking, the present technique is based on a thermodynamic cycle which is reversed compared to the thermodynamic cycle employed by method 10. While method 10 which receives separated media and uses the phase-separation energy of these media to generate a pressure wave (e.g., by forming a concentration gradient), the material separation of the present embodiments receives a fluid mixture and applies to the mixture a pressure wave using an external source of energy. The fluid mixture is preferably gaseous and is brought to contact with a non-gaseous medium, e.g., a sorbent medium, which is selected to allow mass exchange between the media.

The thermodynamic process can be better understood from the following non-limiting example with reference to FIGS. 5A-5E, which follow gas "parcel" during the oscillations of the pressure wave. The description is for the case of a generally standing wave. A description for the case of but one of ordinary skills in the art, provided with the details described herein would know how to adjust the description for the case of traveling wave.

In a simplified manner, the parcel undergoes four stages during a single oscillation cycle. These include expansion (FIG. 5A), mass transfer to the gaseous medium (FIG. 5B), compression (FIG. 5C) and mass transfer from the gaseous medium (FIG. 5D).

In FIGS. 5A-5D, the displacement of the gas parcel (per stage) is denoted $\Delta z$, the local momentary partial pressure of the reactive substance in the gaseous medium is denoted $P_v$, the local equilibrium partial pressure of the reactive substance in the non-gaseous medium is denoted $P_s$, the added or subtracted mass is denoted $\delta m$, the mean partial pressure of the reactive substance is denoted $P_v^m$, and the fluctuation from $P_v^m$ is denoted $P'_v$. The filled rectangles represent the non-gaseous medium with a partial-pressure gradient thereacross, with high partial pressure of the reactive substance at the left side (denoted $P_s^+$), and low partial pressure of the reactive substance at the right side (denoted $P_s^-$).

Figure 5A:
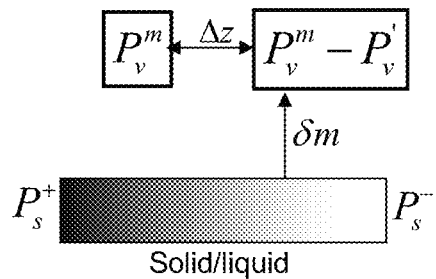
FIGS. 5A-5E are diagrams exemplifying, in a simplified manner, a thermodynamic process employed in some embodiments of the present invention for material separation.
Figure 5B:
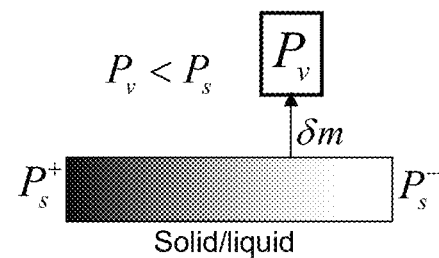
Figure 5C:
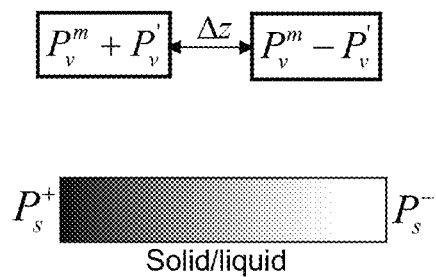
Figure 5D:
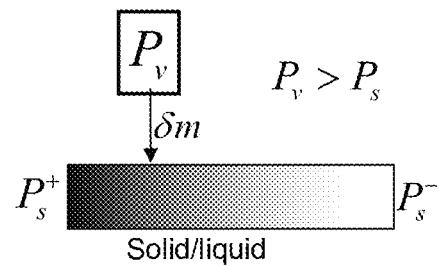

In FIG. 5A, the parcel is in a region in which the partial pressure of the reactive substance equals its mean value, and is thereafter displaced forward over a distance $\Delta z$ towards a region of low concentration. The parcel is expanded by the pressure wave and gains mass at the amount of $\delta m$. The partial gas pressure of the reactive substance is reduced by $P'_v$, so that $P_v = P_v^m - P'_v$. In FIG. 5B, the reduced partial pressure $P_v$, which is lower than the local equilibrium partial pressure $P_s$ of the non-gaseous medium, induces evaporation or desorption of the reactive substance from the non-gaseous medium to the gaseous medium. In FIG. 5C, the parcel is displaced backward and compressed by the pressure wave. The partial gas pressure of the reactive substance is increased by $2P'_v$, so that $P_v = P_v^m + P'_v$. In FIG. 5D, the partial pressure of the reactive substance, which is higher than the local equilibrium partial pressure, induces mass transfer in the opposite direction from the gaseous medium to the non-gaseous medium.

Figure 5E:
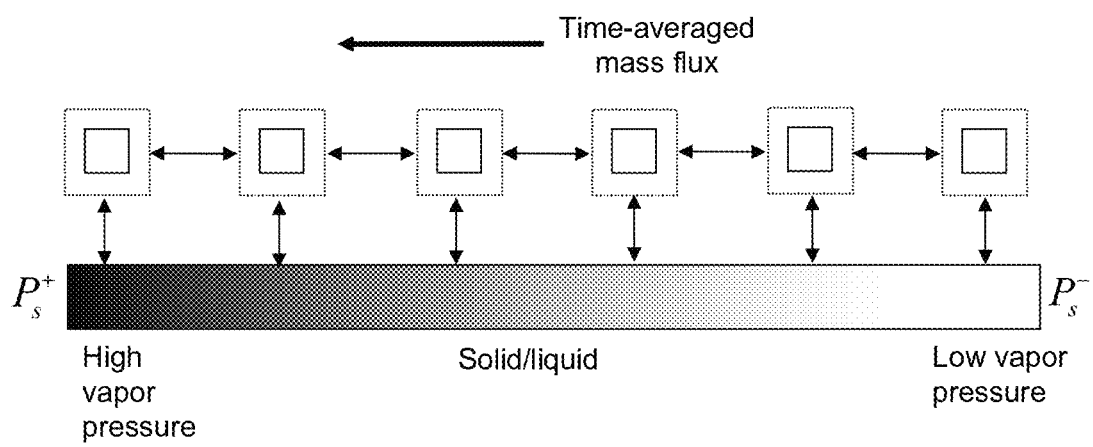

As shown in FIG. 5E, the net effect, when averaged over an oscillation cycle, is a non-zero time-averaged flux of the reactive substance up the concentration gradient (from low to high concentration) as adjacent parcels shuttle mass through repeated cycles. This process is referred to herein as pressure-induced mass exchange and requires expenditure of work, which is supplied by an external energy source.

In the case of travelling-wave phasing, the pressure and displacement are, as stated, out of phase, and the gas parcel is first displaced and then compressed/expanded. Preferably, there is close contact between the sorbent medium and the gas as further detailed hereinabove. Suppose that the parcel is first displaced to a region of low concentration. It is then expanded so that the partial pressure of the reactive component is lower than the local equilibrium partial pressure. Mass is desorbed into the gas. The parcel is then displaced to a region of high concentration where it is compressed. At this stage the partial pressure of the reactive component is higher than the local equilibrium value and mass is transferred to the sorption medium. The net effect over a complete cycle is the transfer of mass from the low concentration region to the high concentration region.

Figure 6:
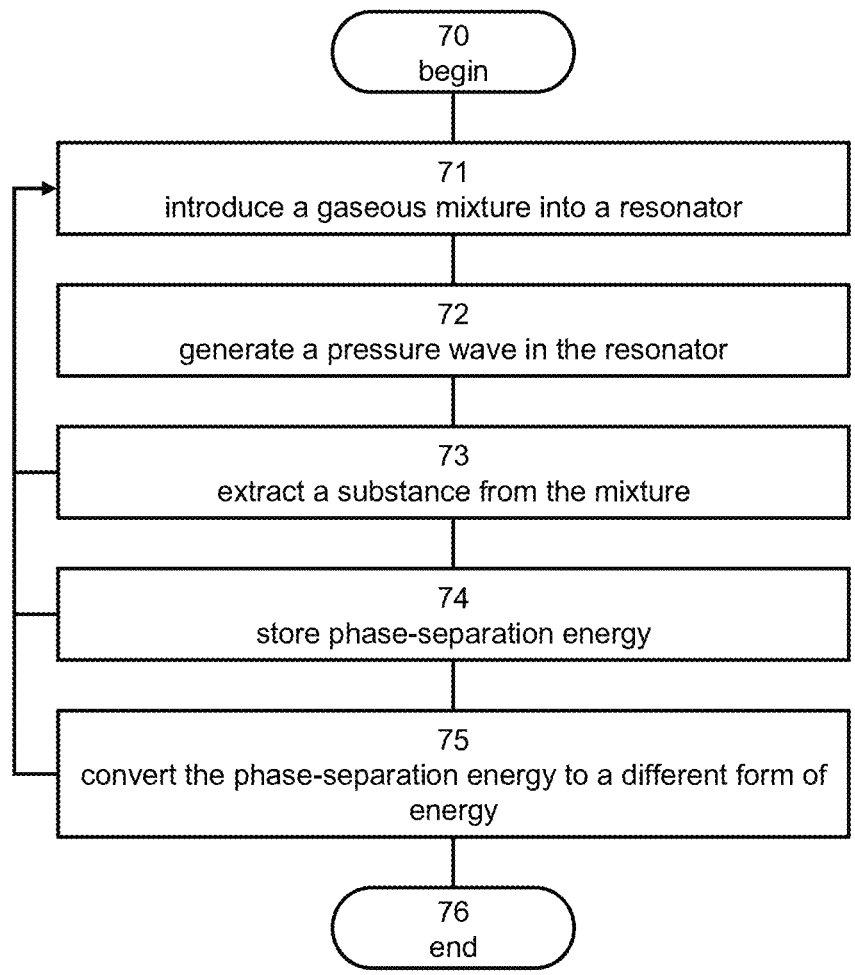
FIG. 6 is a flowchart diagram describing a method suitable for material separation using a pressure wave, according to some embodiments of the present invention.

FIG. 6 is a flowchart diagram describing a method suitable for material separation, according to some embodiments of the present invention.

The method begins at 70 and continues to 71 at which a fluid medium which is a mixture having at least a first substance and a second substance is introduced into an acoustic resonator. In some embodiments of the present invention the fluid medium is a gaseous medium. At least one of the substances in the mixture is a reactive substance as described hereinabove.

The method continues to 72 at which a pressure wave is generated in the resonator. The pressure wave can be generated by an acoustic transducer which receives non-mechanical energy from an external source and converts it to a pressure wave. Representative examples of devices suitable for generating a pressure wave according to some embodiments of the present invention are provided hereinunder. Thus, method 70 receives a mixture and applies to the mixture a pressure wave using an external source of energy.

The pressure wave forms within the resonator at least one region of high concentration of the reactive substance and at least one region of low concentration of the reactive substance. This can be done by contacting the gaseous medium with a sorbent medium, as described above with reference to FIGS. 5A-5E. The sorbent medium preferably sorbs the reactive substance in a selective manner, such that other substances in the gaseous mixture remain in their gaseous phase. Representative examples of sorbent media suitable for the present embodiments are provided hereinunder.

The method continues to 73 at which the reactive substance is extracted from a region of high concentration. Thus, the reactive substance is separated from the gaseous medium. At least some of the extraction is by the sorbent medium itself which sorbs the reactive substance under the influence of the pressure wave as further detailed hereinabove. The reactive substance can also be further extracted out of the resonator by generating efflux from the sorbent medium, e.g., by means of a wick, a dripping faucet or the like. From 73 the method optionally and preferably loops back to 71 to perform multiple cycles of material separation.

The method can also continue to 74 at which the reactive substance and/or gaseous medium are stored, separated from each other. This operation essentially stores the phase-separation energy constituted by the separated phases. When 74 is employed, the method can loop back to 71 after 74. The method can continue to 75 at which the stored phase-separation energy is converted to a different form of energy, e.g., mechanical energy, electrical energy or thermal energy. This can be done, for example, using the energy conversion technique described above (see method 10 and system 30). When 75 is employed, the method can loop back to 71 after 75.

Several operations of method 70 can be executed at different conditions. For example, it is recognized that the efficiency of the energy conversion 75 increases as a function of the temperature. Thus, in some embodiments of the present invention the material separation operations (e.g., 71-74) are executed when the ambient temperature is low (e.g., at night or near sunset or near sunrise), wherein the energy conversion 75 is executed when the ambient temperature is high (e.g., at daytime).

The method ends at 76.

Figure 7:
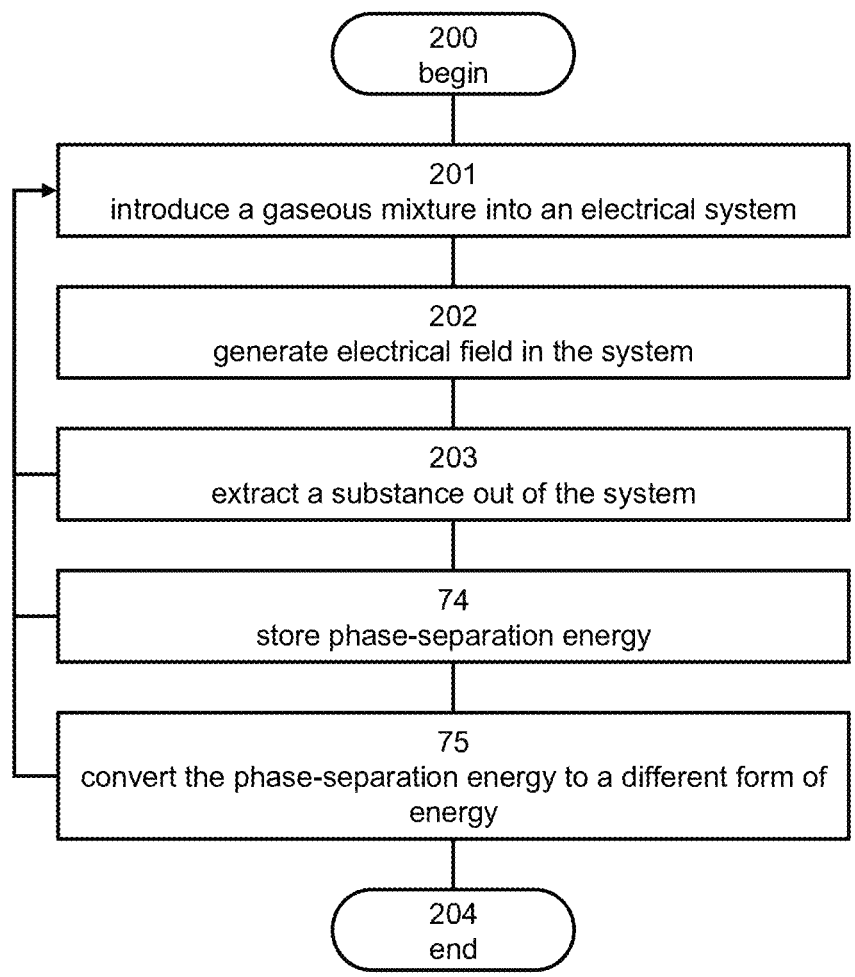
FIG. 7 is a flowchart diagram describing a method suitable for material separation using electrical field, according to some embodiments of the present invention.

FIG. 7 is a flowchart diagram describing a method suitable for material separation, according to some embodiments of the present invention.

The method begins at 200 and continues to 201 at which a fluid medium which is a mixture having at least a first substance and a second substance is introduced into an electrical system capable of generating an electric field, for example, a capacitor system. In some embodiments of the present invention the fluid medium is a gaseous medium. At least one of the substances in the mixture is a reactive substance as described hereinabove.

The method continues to 202 at which an electric field is generated, for example, by applying voltage to the capacitor system. The generated electric field induces mass-exchange between the mixture and the capacitor system. For example, the electric field can induce sorption of the reactive substance in the mixture onto the capacitor plates or stack. Thus, the reactive substance is separated from the gaseous medium. The reactive substance can also be further extracted 203 out of the electrical system by generating efflux from the sorbent medium, e.g., by means of a wick, a dripping faucet or the like. From 203 the method optionally and preferably loops back to 201 to perform multiple cycles of material separation.

The method can store the reactive substance and/or gaseous medium separated from each other, e.g., for additional use as further detailed hereinabove with respect to operations 73-75.

The method ends at 204.

The material separation of the present embodiments can be used in many applications. Separation of mixtures composed of gasses or miscible liquids can be useful, for example, in the chemical industry. Conventional separation techniques include fractional distillation, absorption/adsorption columns, diffusion columns and others.

Distillation normally requires large energy inputs, used for obtaining the optimal temperature for separation. This is traditionally achieved by either heating or cooling, depending on the separated mixture. Adsorption columns require regeneration, and are therefore operated in a batch mode, with two or more adsorption beds alternating between adsorption and regeneration modes. Operation is dependent on externally controlled valves switching the beds between the feed mode and regeneration (heating/vacuum/purge gas, etc.), resulting in a relatively complicated design.

The separation technique of the present embodiments allows the use of absorbing/adsorbing media in a single column with continuous sorption/regeneration cycles, requiring no moving parts other than an acoustic source. The technique of the present embodiments offers a simpler, reliable design, compared with conventional sorption techniques. The technique of the present embodiments may be practice without at least one of: heating, cooling, vacuum and purging, and is therefore advantageous over conventional techniques such as regenerating sorption media and in fractional distillation systems.

The technique of the present embodiments can be used for separation of a variety of gas mixtures. Representative examples include, without limitation, separation of oxygen from air, separation of methane from biogas, separation of hydrogen and methane, natural gas purification from water vapor, $CO_2$ and/or $H_2S$.

Additionally, any liquid mixture separable by distillation, e.g., ethanol-water may be separated. Also contemplated are embodiments in which the material separation technique is utilized for desalination, e.g., by separating fresh water from seawater or water vapors from humid air.

Figure 8:
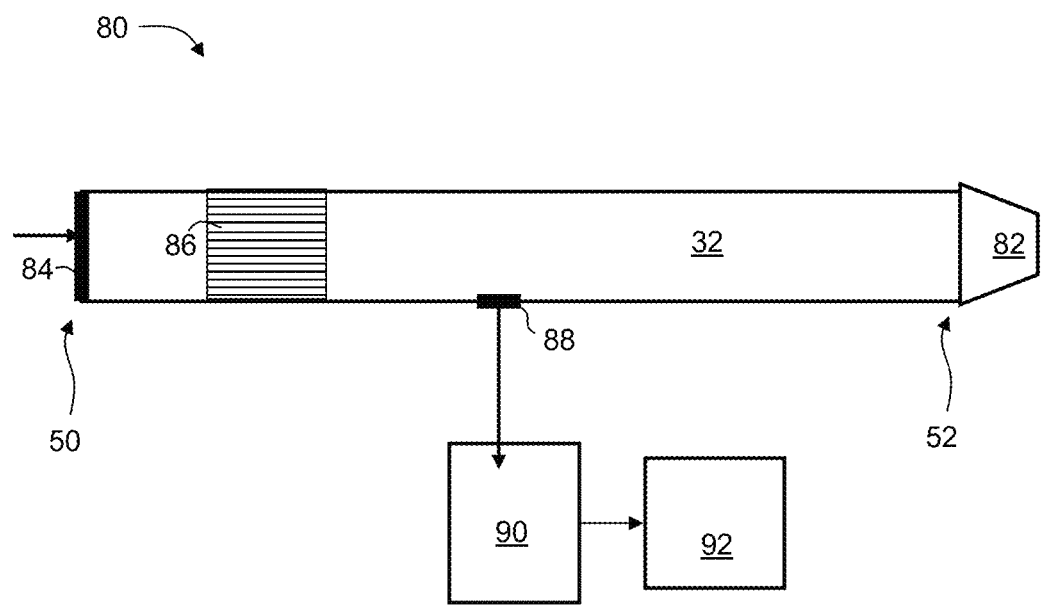
FIG. 8 is a schematic illustration of a system suitable for material separation, according to some embodiments of the present invention.

Reference is now made to FIG. 8 which is a schematic illustration of a system 80 suitable for material separation, according to some embodiments of the present invention. System 80 comprises acoustic resonator 32 a first end 50 and a second end 52. Resonator is configured for receiving a fluid medium which is a mixture having at least a first substance and a second substance. In some embodiments of the present invention the fluid medium is a gaseous medium. At least one of the substances in the mixture is a reactive substance as described hereinabove. The fluid medium is preferably provided into resonator 32 through an inlet port 84 which can be located, for example, at an end 50 of resonator 32. Inlet port 84 can be an orifice of any shape, or a perforated plate, or the like.

System 80 further comprises a pressure wave driver 82 for generating a pressure wave in resonator 32. Pressure wave driver 82 can be located at end 52 of resonator 32 opposite to inlet port 84. Driver 82 can be, for example, an acoustic transducer which receives non-mechanical energy from an external source and converts it to a pressure wave. The acoustic transducer can be of any type, including, without limitation, an electroacoustic transducer, e.g., a loudspeaker and the like. The acoustic transducer can also be a thermoacoustic system, such as system 30 described above, wherein the source of energy for the pressure wave is the phase-separation energy of media other than the medium introduced through port 84. Also contemplated is the use of a thermoacoustic system, such as one of the systems described in U.S. Pat. Nos. 4,398,398; 4,489,553, 4,722,201, 5,303,555, 5,647,216, 5,953,921, 6,032,464, 6,314,740, 7,263,837, 6,804,967 and 6,688,112, and in U.S. Published Application Nos. 20100172213 and 20090268556, the contents of which are hereby incorporated by reference.

Thus, system 30 receives a mixture and applies to the mixture a pressure wave using an external source of energy.

In various exemplary embodiments of the invention system 80 comprises a sorbent medium 86 which exchanges mass with the fluid medium as further detailed hereinabove.

In various exemplary embodiments of the invention sorbent medium 86 is selective for the reactive substance, and has inert relations with any other species in the gaseous medium.

Thus, the sorbent medium is selected base on the substance of interest. For example, when the reactive substance is water, the sorbent medium can be a Lind-type (e.g. 4A) zeolite, silica gel or carbon-nanotubes; for methane, zeolite or activated carbon; for oxygen/nitrogen separation and for water/ethanol separation, zeolite type 4A.

Via the pressure-induced mass exchange principle described above, the pressure wave forms within resonator 32 at least one region of high concentration of the reactive substance and at least one region of low concentration of the reactive substance. In various exemplary embodiments of the invention system 80 comprises a fluid extraction member 88, configured for extracting the reactive substance from a region of high concentration out of resonator 32. Member 88 is preferably located at a pressure node to allow extraction with a reduced or minimal (e.g., zero) sound-radiation losses. Member 88 can be, for example, a wick, a dripping faucet or the like.

Also contemplated, are embodiments in which medium 86 is a capacitor system. In these embodiments, it is not necessary for system 80 to produce a pressure wave, since the capacitor system can be applied with voltage to produce electric field and induce material separation as further detailed hereinabove. Thus, system 80 may or may not comprise resonator 32 and driver 82, as desired. Embodiments in which system 80 comprises a combination of a capacitor system as medium 86 and resonator 32 are additional envisaged. In these embodiments, alternating voltage is applied to the capacitor system thereby inducing sorption/desorption and the mass addition/abstraction which is required for producing the pressure wave.

System 80 optionally and preferably also comprises one or more storage containers 90 for storing the reactive substance and/or remaining fluid medium separated from each other. In some embodiments of the present invention system 80 comprises also an energy conversion system 92 which converts the phase-separation energy constituted by the separated phases into another form of energy, e.g., mechanical, electrical or thermal energy. The principles and operations of system 92 are preferably similar to principles and operations of system 30.

Figure 9:
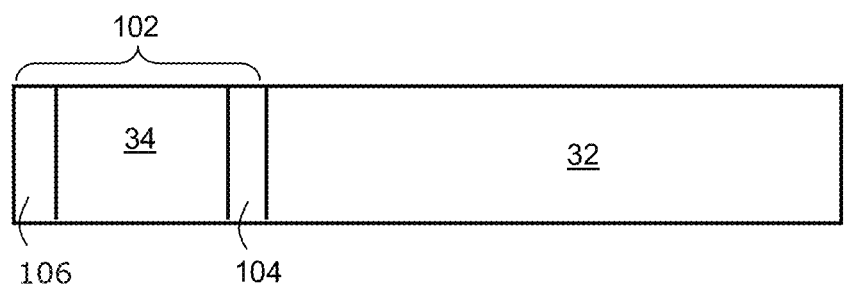
FIG. 9 is a schematic illustration of a thermoacoustic system, according to some embodiments of the present invention.

The mass-exchange principle of the present embodiments can be utilized also in other systems. A representative example of such system is illustrated in FIG. 9. Shown in FIG. 9 is a thermoacoustic system 100 which comprises resonator 32 having therein at least one thermoacoustic unit 102 under a temperature gradient. For example, unit 102 can comprise, or be placed between, a hot heat exchanger 104 and a cold heat exchanger 106. Thermoacoustic unit 102 can be of any type, including, without limitation, a regenerator engine unit, a stack engine unit, a regenerator refrigerator unit, and a stack refrigerator unit. System 100 further comprises phase-exchange device 34 configured for forming across thermoacoustic unit 102 a concentration gradient of the reactive substance in gaseous medium contained by the resonator. Phase-exchange device 34 can be, for example, a sorbent medium as further detailed hereinabove. The principles and operations of system 100 is generally similar to the principles and operations of conventional thermoacoustic system, except that the phase-exchange further contributes to the efficiency of energy conversion or material separation.

It is expected that during the life of a patent maturing from this application many relevant thermoacoustic systems will be developed and the scope of the term thermoacoustic unit is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following example.

EXAMPLES

Reference is now made to the following examples, which together with the above descriptions illustrate some embodiments of the invention in a non limiting fashion.

Example 1

In the present example, a model which demonstrates the phase-exchange effect of the present embodiments is presented.

Model Formulation

Figure 10:
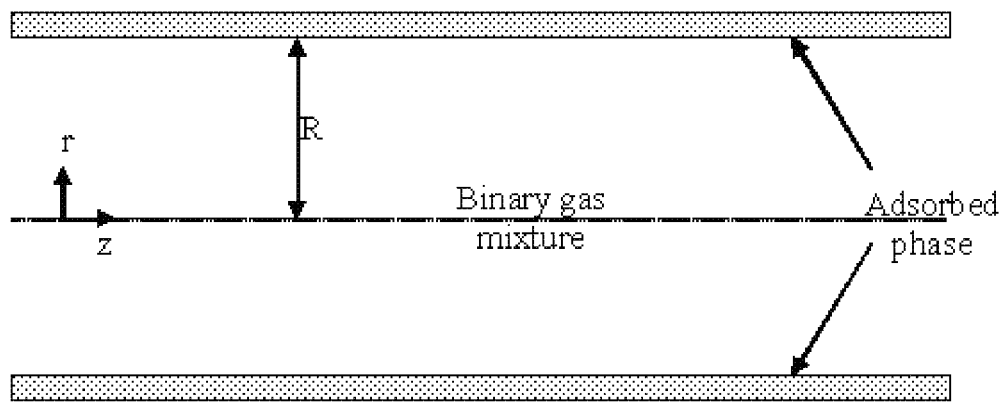
FIG. 10 is a schematic illustration of a model geometry used in calculations performed in accordance with some embodiments of the present invention.

Consider a sound wave propagating through a cylindrical tube filled with a mixture of two gasses. The tube wall is coated with a thin layer of adsorbent material. Due to the presence of the adsorbent, a component of the mixture may undergo a reversible adsorption process through which mass is exchanged between the mixture and the solid wall. This component is referred to as the "reactive component". The basic geometry of the system is schematically depicted in FIG. 10.

The hydrodynamic equations which govern the transport of mass, momentum and energy in a binary mixture are as follows.

Continuity of the mixture, $$\frac{\partial \rho}{\partial t} + \nabla \cdot (\rho v) = 0, \quad (1)$$

where $\rho$ is the density, and v is the density-weighted hydrodynamic velocity of the mixture defined as $$v = \frac{\rho_1 v_1 + \rho_2 v_2}{\rho}, \quad (2)$$

in which $v_1$ and $v_2$ are the velocities of the two components, and $\rho_1$ and $\rho_2$ are their respective densities.

Continuity of the reactive component (designated as component 1), in terms of its concentration, expressed as the mole fraction $C_1 = n_1/n$, $$n\left(\frac{\partial C_1}{\partial t} + v \cdot \nabla C_1\right) = -\nabla \cdot j. \quad (3)$$

Here, the mixture molar density is denoted by n and j is the diffusive flux density which, for a binary mixture, is defined as:

$$j = \frac{n_1 n_2}{n}(\vec{V}_1 - \vec{V}_2) = -nD_{12}\left(\nabla C_1 + \frac{k_T}{T}\nabla T + \frac{k_P}{P}\nabla P\right), \quad (4)$$

with $D_{12}$, $k_T$ and $k_P$ denoting the binary molecular diffusion coefficient, thermal diffusion ratio and baro-diffusion ratio, respectively. The diffusion velocities, $V_1$ and $V_2$ correspond to the difference between the velocity of each component and the mass averaged velocity, i.e. $V_i = v_i - v$. In a binary mixture, it follows that $V_1 - V_2 = v_1 - v_2$.

The equation of motion for the mixture is given by:

$$\rho\left(\frac{\partial v}{\partial t} + v \cdot \nabla v\right) = -\nabla p + \mu \nabla^2 v + \left(\zeta + \frac{\mu}{3}\right)\nabla(\nabla \cdot v), \quad (5)$$

where $\zeta$ is the bulk viscosity.

The entropy equation, derived from the conservation of energy, is $$\rho T\left(\frac{\partial s}{\partial t} + v \cdot \nabla s\right) = \sum_{ij} \frac{\partial v_i}{\partial x_j} - \nabla \cdot (q - \mu_c j) - j \cdot \nabla \mu_c, \quad (6)$$

where s is the entropy, $\Sigma_{ij}$ is the viscous stress tensor, $\mu_c$ is the chemical potential of the mixture and the heat flux, q, is given by:

$$q = \left(k_T\left(\frac{\partial \mu_c}{\partial C_1}\right)_{p,T} - T\left(\frac{\partial \mu_c}{\partial T}\right)_{p,C_1} + \mu_c\right)j - \kappa \nabla T. \quad (7)$$

The terms on the right-hand-side of equation ((6)) are source terms, representing dissipation (or entropy "production") by internal friction in the fluid and by the irreversible processes of heat conduction and mass diffusion.

The above equations can be reduced, according to some embodiments of the present invention. For individual components and mixture which are ideal gases, the following are definitions are used.

The equation of state $$p = nR_g T. \quad (8)$$

The temperature of the mixture and each component is equal, i.e. $T = T_1 = T_2$.

The total pressure is the sum of partial pressures, $p = p_1 + p_2$ and likewise for the molar density, n, $n = n_1 + n_2$.

The equations can also be linearized by substituting for each variable a time-averaged, ambient value and a small oscillating component, as follows:

$$\vec{v}(r,z,t) = \vec{v}\,'(r,z)e^{i\omega t}$$

$$p(r,z,t) = p_m + p'(r,z)e^{i\omega t}$$

$$\rho(r,z,t) = \rho_m(z) + \rho'(r,z)e^{i\omega t}$$

$$T(r,z,t) = T_m(z) + T'(r,z)e^{i\omega t}$$

$$C(r,z,t) = C_m(z) + C'(r,z)e^{i\omega t}$$

$$s(r,z,t) = s_m(z) + s'(r,z)e^{i\omega t} \quad (9)$$

In the above definitions, primed quantities denote a small, fluctuating component and the subscript m denotes the mean, or ambient, value. For clarity of presentation, and without loss of generality, a subscript 1 or 2 will be used hereinafter to indicate each component, where it is to be understood that unprimed quantities represent the ambient values. The subscript m will still be used to denote ambient variables related to the mixture. The mean component of these variables is a real number, while the primed quantities represent complex amplitudes of a small perturbation of the mean.

In defining these expansions, it has been assumed that the tube radius is small enough so that there is no azimuthal dependence, and mean components of variables such as the temperature and density are in local equilibrium and constant at any given cross-section; hence, they may be taken as functions of the axial position alone. It is further assumed that the mean pressure is constant, and that there is no mean component of the velocity, to first order. Additionally, the so-called "low reduced frequency approximation" [Raspet et al., "Theory of inert gas-condensing vapor thermoacoustics: Propagation equation," Journal of the Acoustical Society of America, 112~(4), 2002, 1414; H. Tijdeman, "On the propagation of sound waves in cylindrical tubes," Journal of Sound and Vibration 162, 1975, 1] is invoked, according to which axial diffusion, the radial velocity component and compressional friction may be neglected, provided that $$\Omega_r \equiv \frac{\omega R}{c_s} = \frac{2\pi R}{\lambda} \ll 1,$$

where $\lambdabar$ is the reduced acoustic wavelength. This condition is readily satisfied for a wide range of frequencies and tube radii.

Next, the expanded variables are substituted into the system of equations ((1)-(6)), keeping terms up to first order in the oscillating variables and their products. With the above approximations, the following simplified equations are obtained.

The continuity equation for the mixture $$i\omega\rho' + u'\frac{\partial \rho_m}{\partial z} + \rho_m \frac{\partial u'}{\partial z} + \frac{\rho_m}{r}\frac{\partial}{\partial r}(rv') = 0. \tag{10}$$

The axial component of the momentum equation, $$i\omega\rho_m u' = -\frac{\partial p'}{\partial z} + \frac{\mu}{r}\frac{\partial}{\partial r}\left(r\frac{\partial u'}{\partial r}\right). \tag{11}$$

The radial component of the momentum equation, $$\frac{\partial p'}{\partial r} = 0. \tag{12}$$

The radial diffusive mass flux, $$j_r = -nD_{12}\frac{\partial C}{\partial r}, \tag{13}$$

in which the thermal diffusion and baro-diffusion terms have been omitted. This is justified since the thermal diffusion ratio is typically very small (for example, in an air-water vapor mixture at a temperature of 30° C., $k_T$ is approximately 0.001), and baro-diffusion is negligible since the characteristic pressure gradients are not high.

The continuity equation for the reactive component, eliminating the $-\nabla \cdot j$ term using equation ((13)), becomes $$i\omega C_{1'} + u'\frac{\partial C_{1'}}{\partial z} = \frac{D_{12}}{r}\frac{\partial}{\partial r}\left(r\frac{\partial C_{1'}}{\partial r}\right). \tag{14}$$

The linearized entropy equation can be written as $$\rho_m T_m\left(i\omega s' + u'\frac{\partial s}{\partial z}\right) = \frac{\kappa}{r}\frac{\partial}{\partial r}\left(r\frac{\partial T'}{\partial r}\right) + T_m\left(\frac{\partial \mu_c}{\partial T}\right)_{P,C}\frac{\partial j}{\partial r}, \tag{15}$$

where, since the diffusive flux density j is of the same order of magnitude as the gradient in the chemical potential, their products are considered as second order quantities. Thus, for example, the term $j \cdot \nabla \mu_c$, is dropped. The viscous dissipation term, which is quadratic in the velocities, is also of second order and is neglected, as is the thermal diffusion term in the heat flux, Q (see equation (7)). Next, the entropy is expressed in terms of the pressure, temperature and concentration by use of the thermodynamic relation $$s' = \frac{c_p}{T_m}T' - \left(\frac{\partial \mu_c}{\partial T}\right)_{P,C_1} C_{1'} + \frac{\beta_T}{\rho_m}p',$$

upon substitution of the expression for the entropy, with the ideal gas relation $\beta_T = 1/T_m$, the obtained equation is $$i\omega\rho_m c_p T' - \frac{\kappa}{r}\frac{\partial}{\partial r}\left(r\frac{\partial T'}{\partial r}\right) = i\omega p' - \rho_m c_p u'\frac{\partial T'}{\partial z}, \tag{16}$$

which governs the temperature fluctuations in the mixture.

The boundary conditions for the above equations generally include conditions for the velocity, temperature and concentration, as well as the heat and mass fluxes at the solid boundary.

For the axial velocity, u', the conditions are used:

$$u' = 0, r = R \text{ and } \frac{\partial u'}{\partial r} = 0, r = 0 \tag{17}$$

corresponding with the usual no-slip condition at the solid boundary and a finite velocity at the tube axis.

The temperature and heat flux at the solid-fluid interface are assumed to be continuous:

$$\kappa_s \frac{\partial T_{s'}}{\partial r} - \kappa \frac{\partial T'}{\partial r} = j_r \Delta H \text{ and } T' = T_{s'}, r = R, \tag{18}$$

with $T_{s'}$ and $\kappa_s$ denoting the temperature at the solid wall and the solid thermal conductivity, respectively, and $\Delta H$ is the heat of adsorption.

The boundary conditions couple the equation for the gas temperature, ((16)), with a heat conduction equation within the solid, the solution to which provides the oscillating temperature and heat flux at the boundary.

For a solid with a sufficiently large heat capacity to enforce a constant temperature, the temperature at the wall does not oscillate:

$$T'=0, r=R \tag{19}$$

This condition has been widely used in the thermoacoustic literature, and is a good approximation for many materials used for constructing stacks (see, for example, G. W. Swift, "Thermoacoustic engines," Journal of the Acoustical Society of America 84(6), 1988, 1145; and "Thermoacoustics: A unifying perspective for some engines and refrigerators," Acoustical Society of America, Melville, N.Y., 2002).

The concentration and mass flux at the solid are, in general, given by equations analogous to those for the temperature and heat flux. For sufficiently thin adsorbent layer and/or appropriately-defined averaged concentration in the solid phase, the adsorbed phase concentration within the layer can be considered uniform along the radial direction. This approximation is referred to in the literature as the "linear driving force model" [D. Duong, "Adsorption Analysis: Equilibria and Kinetics," Imperial College Press, 1998].

In the case of fast kinetics, the boundary condition imposed on the concentration corresponds with the equilibrium relation:

$$C_1' = \frac{C_m}{K_H p_m} p', \quad (20)$$

where $$K_H = K_0 e^{\frac{\Delta H}{R_g T}},$$

is a type of Henry coefficient, and $K_0$ is a coefficient dictating the partitioning between the concentrations in the gas and solid phases. It is noted that this condition is also representative of a liquid film, whereby $K_0$ may be a function of the solute concentration in a solution. This condition is based on the assumption that the adsorbed phase exhibits an ideal gas behavior with respect to its "vapor pressure," in the Henry's law regime (this is sometimes referred to in the literature as the "spreading pressure", cf. Duong supra).

Next, a boundary condition on the transverse velocity components, $v_i$, is formulated. The velocity components are related to the diffusive flux and the mass-averaged velocity through $$v_1 - v_2 = -\frac{n^2}{n_1 n_2} D_{12} \frac{\partial C_1'}{\partial r}, \quad r = R, \quad (21)$$

and $$v = \frac{\rho_1 v_1 + \rho_2 v_2}{\rho}. \quad (22)$$

Since, in the present example, which is not to be considered as limiting, only one component is reactive (component 1), the non-reactive component's velocity, $v_2$, approximately vanishes at the wall. Therefore, the radial component of the mass average velocity is reduced to $$v' = -\frac{\rho_1}{\rho} \frac{n^2}{n_1 n_2} D_{12} \frac{\partial C_1'}{\partial r} = -\frac{m_1}{M} \frac{n}{n_2} D_{12} \frac{\partial C_1'}{\partial r}, \quad r = R, \quad (23)$$

with $m_1$ and M denoting the molecular mass of the reactive component and the molar-averaged molecular mass of the mixture, $M = m_1 C_1 + m_2 C_2$.

The solutions of the equations for the velocity, temperature and concentration, will now be presented.

Under the low reduced frequency approximation, wherein the pressure is assumed to vary only in the axial direction, the axial momentum equation ((11)) is solved subject to the boundary conditions ((17)):

$$u' = \frac{i}{\rho_m \omega} \frac{dp'}{dz} F_\mu. \quad (24)$$

Here the following notations were introduced:

$$F_i = 1 - \frac{J_0(\hat{\alpha}_i \eta)}{J_0(\hat{\alpha}_i)}, \quad i = \mu, \kappa, D, \quad (25)$$

where $\eta = r/R$ is the scaled radial coordinate, and $$\hat{\alpha}_\mu = i^{3/2} \alpha_\mu, \quad \alpha_\mu = R \sqrt{\frac{\omega}{\nu}}. \quad (26)$$

The function $F_i$ describes transverse variations, and changes in form according to the system geometry; the subscript $i = \mu, \kappa, D$ corresponds with viscous, thermal and diffusive processes, respectively. $\alpha_\mu^2$ is the ratio of the viscous time scale, $\tau_\mu = R^2 \rho_m / \mu$ and the oscillation time scale, $\tau_\omega = 1/\omega$. Another related quantity is the viscous penetration depth (or stokes boundary layer thickness), $\delta_\mu = \sqrt{2\nu/\omega} = \alpha_\mu/\sqrt{2} R$, which is a measure of the distance across which momentum diffuses over the course of half an oscillation cycle. The penetration depths indicate the extent to which the working fluid interacts with the solid boundary.

The temperature distribution is obtained by solving equation ((16)) with the boundary condition ((19)) and the requirement that the temperature is finite at the tube axis:

$$T' = \frac{F_\kappa}{\rho_m c_p} p' - \frac{1}{\rho_m \omega^2} \frac{dp'}{dz} \left( \frac{F_\kappa - Pr F_\mu}{1 - Pr} \right) \frac{dT_m}{dz}, \quad (27)$$

where the function, $F_\kappa$ is of the same form as the viscous function defined above, with the parameter $\hat{\alpha}_\mu$ replaced by its thermal analogue, given by $$\hat{\alpha}_\kappa = i^{3/2} \alpha_\kappa, \quad \alpha_\kappa = R \sqrt{\frac{\omega \rho_m c_p}{\kappa}} = \sqrt{2} R / \delta_\kappa. \quad (28)$$

Here, $\delta_\kappa$ is the thermal penetration depth and the Prandtl number is defined as $$Pr = \frac{\mu c_p}{\kappa} = \frac{\alpha_\kappa^2}{\alpha_\mu^2}. \quad (29)$$

The parameter $\alpha_\kappa^2$ represents the ratio of the characteristic time for heat conduction, $\tau_\kappa = R^2 \rho_m c_p / \kappa$, to the oscillation time scale $\tau_\omega = 1/\omega$.

The concentration fluctuations are found to be $$C_1' = \frac{C_m}{K_H p_m} (1 - F_D) p' - \frac{1}{\rho_m \omega^2} \frac{dp'}{dz} \left( \frac{F_D - Sc F_\mu}{1 - Sc} \right) \frac{dC_1}{dz}, \quad (30)$$

in which the diffusive function $F_D$ is introduced, with the parameter $\hat{\alpha}_D$ given by $$\hat{\alpha}_D = i^{3/2} \alpha_D, \quad \alpha_D = R \sqrt{\frac{\omega}{D_{12}}} = \sqrt{2} R / \delta_D. \quad (31)$$

Similar to the heat conduction case, $\delta_D$ is the diffusive penetration depth and the Schmidt number is defined as $$Sc = \frac{\mu}{\rho_m D_{12}} = \frac{\alpha_D^2}{\alpha_\mu^2}. \quad (32)$$

The parameter $\alpha_D^2$ represents the ratio of the characteristic time for molecular diffusion, $\tau_D=R^2/D_{12}$, to the oscillation time scale, $\tau_\omega$.

The wave equation for the pressure fluctuations will now be derived. Without loss of generality, wave equation is derived for the case of one non-reactive component and one reactive component, but the skilled person would readily know how to adjust the derivation for a more general case in which the mixture includes any positive number of reactive components and any non-negative number of non-reactive components.

The reactive component undergoes a reversible phase exchange with the wall. The rate of the exchange is assumed to be sufficiently high so that equilibrium exists between the gas and adsorbed phases at the solid boundary. In the following derivation, modifications to the sound wave, due to temperature and concentration fluctuations, viscous and thermal dissipation processes as well as the presence of axial concentration and temperature gradients, are considered.

The equation of state in terms of the mixture density is:

$$\rho = \frac{p}{R_g T} \frac{\rho}{n}. \tag{33}$$

Employing the relations $\rho=n_1 m_2 + n_2 m_2$, $C_1=n_1/n$ and $\Sigma C_i=1$, $\rho$ becomes:

$$\rho = \frac{p}{R_g T} \frac{n_1 m_1 + n_2 m_2}{n} = \frac{p}{R_g T}[(m_1 - m_2)C_1 + m_2]. \tag{34}$$

Since $\rho=\rho(p,T,C_1)$, a series expansion yields, to first order, $$d\rho = \left(\frac{\partial \rho}{\partial T}\right)_m dT + \left(\frac{\partial \rho}{\partial p}\right)_m dp + \left(\frac{\partial \rho}{\partial C_1}\right)_m dC_1 \tag{35}$$

with the subscript m indicating that the differentiation is made with respect to the ambient values. Using the modified equation of state, ((34)), for evaluating the derivatives with respect to the pressure, temperature and concentration, yields the following relation for the density fluctuations:

$$\frac{\rho'}{\rho_m} = \frac{p'}{p_m} - \frac{T'}{T_m} + \frac{(m_1 - m_2)}{M} C_1'. \tag{36}$$

For convenience, the first-order continuity equation for the mixture is rewritten, $$i\omega\rho' + \mu'\frac{\partial \rho_m}{\partial z} + \rho_m \frac{\partial \mu'}{\partial z} + \frac{\rho_m}{r}\frac{\partial}{\partial r}(rv') = 0. \tag{37}$$

Eliminating $\rho'$ using equation ((36)) and taking the cross-section average yields $$\frac{i\omega}{p_m}p' - \frac{i\omega}{T_m}\langle T'\rangle + \frac{i\omega(m_1 - m_2)}{M}\langle C'\rangle + \langle u'\rangle \frac{d\rho_m}{dz} + \frac{d\langle u'\rangle}{dz} + \frac{2}{R}v'|_{r=R} = 0 \tag{38}$$

where the condition that $v'(0)=0$ has been used, and the ambient density gradient can be evaluated as $$\frac{d\rho_m}{dz} = \rho_m \frac{m_1 - m_2}{M} \frac{dC_1}{dz} - \frac{\rho_m}{T_m} \frac{dT_m}{dz}, \tag{39}$$

in which it has been assumed that there is no axial gradient in the mean pressure, i.e., $dp_m/dz=0$.

The cross-sectional averaged velocity is $$\langle u' \rangle = \frac{iG_\mu}{\rho_m \omega} \frac{dp'}{dz}, \tag{40}$$

where the notation $G_i = \langle F_i \rangle$ has been introduced to indicate the cross-section averaged dissipation functions. Specifically, $$G_i = 2\int_0^1 \left(1 - \frac{J_0(\hat{\alpha}_i \eta)}{J_0(\hat{\alpha}_i)}\right)\eta d\eta = 1 - \frac{2J_1(\hat{\alpha}_i)}{\hat{\alpha}_i J_0(\hat{\alpha}_i)} \quad i = \mu, \kappa, D \tag{41}$$

Next, the cross-section averaged temperature is obtained in a similar fashion, yielding $$\langle T' \rangle = \frac{G_\kappa}{2\rho_m c_p} p' - \frac{1}{2\rho_m \omega^2} \frac{dp'}{dz} \frac{dT_m}{dO}\left(\frac{G_\kappa - PrG_\mu}{1-Pr}\right). \tag{42}$$

Likewise, the cross-section averaged concentration is found to be $$\langle C_{1'} \rangle = \frac{C_1}{K_H p_m}(1 - G_D)p' - \frac{1}{\rho_m \omega^2}\frac{dC_1}{dz}\frac{dp'}{dz}\left(\frac{G_D - ScG_\mu}{1-Sc}\right) \tag{43}$$

The remaining condition for the radial velocity at the wall, as given by equation ((21)), is written as $$v'|_{r=R} = \tag{44}$$
$$-i\frac{m_1}{M}\frac{n}{n_2}\frac{\omega R}{2}\left(\frac{C_1}{K_H p_m}(1-G_D)p' + \frac{1}{\rho_m \omega^2}\left(\frac{G_D - G_\mu}{1-Sc}\right)\frac{dp'}{dz}\frac{dC_1}{dz}\right)$$

Next, the obtained relations for the averaged axial velocity, temperature and concentration, along with the expression for the radial velocity, are substituted into the averaged continuity equation ((38)). Using the thermodynamic relations $p_0 = \rho_m c_s^2/\gamma$ and $T_m c_p = c_s^2/(\gamma-1)$ the following equation is obtained, $$\rho_m \frac{d}{dz}\left(\frac{G_\mu}{\rho_m}\frac{dp'}{dz}\right) + \left(\frac{1}{T_m}\left(\frac{G_\kappa - G_\mu}{1-Pr}\right)\frac{dT_m}{dz} + \frac{1}{C_2}\left(\frac{G_d - G_\mu}{1-Sc}\right)\frac{dC_1}{dz}\right)\frac{dp'}{dz} + \tag{45}$$
$$\gamma\frac{\omega^2}{C_S^2}\left(1 + \frac{\gamma - 1}{\gamma}G_\kappa - \frac{1}{K_H}\frac{C_1}{C_2}(1-G_D)\right)p' = 0$$

This equation describes the axial dependence of the pressure perturbation or the propagation of the sound wave. The last term, multiplying p', represents the complex wave number squared, with dissipation due to viscous friction as well as relaxation effects stemming from both heat and mass exchange with the solid wall. The term multiplying the pressure gradient describes the gain/attenuation of the sound field. This term demonstrates that formation of a gradient in the mole fraction of a reactive component in accordance with some embodiments of the present invention generates a pressure wave.

The Concentration Gradient

A mole fraction gradient may be formed according to the present embodiments in many ways. In the present example, a system in which mass is not actively added/removed from the system is considered.

The mole fraction gradient can be written as $$\frac{dC_1}{dz} = \frac{d}{dz}\left(\frac{n_1}{n}\right) = n_1 \frac{d}{dz}\left(\frac{1}{n}\right) + \frac{1}{n}\frac{dn_1}{dz}. \tag{46}$$

Using the ideal gas law, the following relation is fulfilled $$\frac{d}{dz}\left(\frac{1}{n}\right) = \frac{1}{nT_m}\frac{dT_m}{dz}. \tag{47}$$

$n_1 = f(T_m, K_0)$ and therefore $$\frac{dn_1}{dz} = \frac{dn_1}{dT_m}\frac{dT_m}{dz} + \frac{dn_1}{dK_0}\frac{dK_0}{dz} \tag{48}$$

The gas-solid equilibrium relation is written as $$n_1 = \frac{p_m}{K_0 R_g T} e^{-\frac{\Delta H}{R_g}\left(\frac{1}{T} - \frac{1}{T_0}\right)} \tag{49}$$

where $T_0$ is a reference temperature, at which the value of $K_0$ is given. Differentiating this expression with respect to T, and again using the ideal gas law, the following relation is obtained $$\frac{dn_1}{dz} = \frac{n_1}{T_m}\left(\frac{\Delta H}{R_g T_m} - 1\right). \tag{50}$$

In addition, $$\frac{dn_1}{dK_0} = -\frac{n_1}{K_0}. \tag{51}$$

Combining the above expressions the following result is obtained:

$$\frac{dn_1}{dz} = \frac{n_1}{T_m}\left(\frac{\Delta H}{R_g T_m} - 1\right)\frac{dT_m}{dz} - \frac{n_1}{K_0}\frac{dK_0}{dz}, \tag{52}$$

and equation ((46)) may be expressed as $$\frac{dC_1}{dz} = \frac{C_1 \Delta H}{R T_m^2}\frac{dT_m}{dz} - \frac{C_1}{K_0}\frac{dK_0}{dz}, \tag{53}$$

which demonstrates that in a system in which mass is not actively added or removed, a gradient in the mole fraction of the reactive component can be generated by a temperature gradient $dT_m/dz$ and/or an axial variation in the properties of the solid-gas equilibrium as manifested by $K_0$. Note that the concentration gradient depends on the ratio $C_1/K_0$ the latter depending on the ambient equilibrium.

It is noted that when a vapor-liquid equilibrium is present, the mole fraction is altered by a temperature change. However, if the liquid has some absorption capacity for the vapor, as in the case of, for example, desiccant solutions and water vapor, an axial gradient in this property incurs a corresponding change of the vapor mole fraction in equilibrium with the liquid. In some embodiments of the present invention this is achieved by varying the concentration of the desiccant fluid. Equation ((49)) can be viewed as a form analogous to the Clausius-Klapeyron equation, describing vapor-liquid equilibrium.

The parameter $K_0$ modifies this relation so as to lower the amount of vapor in equilibrium with the adsorbed phase, compared with the corresponding case of a pure liquid phase. For example, water vapor may adsorb into the pores of zeolites well beyond the point where simple condensation will not occur, i.e. above the boiling point. Another example is the adsorption of gasses such as $N_2$, $O_2$, $CO_2$ and others.

Onset of Concentration-Driven Oscillations in a Binary Mixture

For the purposes of the forthcoming analysis, it is convenient to rewrite equation ((45)) as two coupled first-order equations for the pressure and the cross-sectional average velocity, as follows:

First, equation ((40)) is rewritten as $$\frac{dp'}{dz} = -\frac{i\omega \rho_m}{G_\mu}\langle u' \rangle, \tag{54}$$

next, the z derivative of equation ((40)) is calculated, to obtain $$\rho_m \frac{d}{dz}\left(\frac{G_\mu}{\rho_m}\frac{dp'}{dz}\right) = -i\omega \rho_m \frac{d\langle u' \rangle}{dz}, \tag{55}$$

which, upon substitution into equation ((45)) with the use of equation ((40)), results in $$\frac{d\langle u' \rangle}{dz} = -\frac{i}{\omega \rho_m}k^2 p' - \Lambda \langle u' \rangle, \tag{56}$$

where $$k^2 = \gamma \frac{\omega^2}{c_s^2}\left(1 + \frac{\gamma-1}{\gamma}G_\kappa - \frac{C_1}{K_H C_2}(1 - G_D)\right) \tag{57}$$

is the complex wave number squared, and $$\Lambda = \frac{1}{T_m}\frac{dT_m}{dz}\left(\frac{G_\kappa/G_\mu - 1}{1 - Pr}\right) + \frac{1}{C_2}\frac{dC_1}{dz}\left(\frac{G_D/G_\mu - 1}{1 - Sc}\right). \quad (58)$$

is the gain/attenuation coefficient.

Typically, two boundary conditions are required for the solution of the above system, one for each variable. However, for example, in a closed ended tube (half wavelength resonator) only the conditions for the velocity are known (i.e. u=0 at the closed ends), while the stability limit would physically require that the pressure be non-zero, yet unknown a-priori.

The stability limit can be found in more than one way. The coupled equations can be solved by a shooting method, where an initial value for the pressure is guessed as well as the value of the angular frequency ω, taken to be real valued. The equations are therefore integrated until, at the second boundary, complex values for the velocity and pressure are found. A root finding procedure is employed, adjusting the guessed initial value until the calculated value of the velocity conforms, within a determined tolerance, with the boundary condition (u=0). The corresponding complex frequency is calculated accordingly, satisfying the requirement that a generally standing wave is formed in the resonator. Alternatively, one can specify a pressure input at one boundary and then numerically calculate whether it is damped or amplified as it propagates through the stack. Following is a description of an approximation method, which allows the derivation of analytical expressions through which the conditions for self-sustained oscillations can be found.

An intuitive, analytical approach for obtaining the stability limit can be taken by considering not the pressure perturbation, but rather the power flow within the stack. The power produced along a differential stack element is considered as the difference between the cross-sectional and time averaged acoustic intensity on either side of the stack element. Onset of self oscillations is reached at the point where the power produced within the stack matches all losses within the stack as well as the remaining segments of the acoustic network.

Mathematically, this approach can be expressed as follows $$d\dot{W} = A(\langle pu \rangle_{z+dz} - \langle pu \rangle_z), \quad (59)$$

which is equivalent, to first order, to $$d\dot{W} = A\frac{d}{dz}\langle p'u'\rangle dz. \quad (60)$$

Recalling that the time-averaged product of the two complex quantities, p' and u', is $$\overline{p'u'} = \tfrac{1}{2}Re(p'u'^*), \quad (61)$$

where the star symbol denotes a complex conjugate, equation ((60)) can be rewritten as $$d\dot{W} = \tfrac{1}{2}A R\left(u'^*\frac{dp'}{dz} + p'\frac{du'^*}{dz}\right)dz \quad (62)$$

Expressions for dp'/dz and d⟨u'⟩/dz have already been obtained from the wave equation and the velocity distribution. Rather than numerically solving for the pressure and velocity, it is assumed that they follow a generally standing wave phasing:

$$p' = P_0 \cos(\varphi), \quad (63)$$

where $P_0$ is the pressure amplitude at the closed end of the resonator, and $$u' = -i\frac{P_0}{\rho_m c_s}\sin(\phi). \quad (64)$$

The phase angle, φ is generally given by $$\varphi(z) = \int_0^z k(\zeta)d\zeta, \quad (65)$$

accounting for possible axial variations in the wave number. This is mainly due to the dependence of various physical properties on the mixture composition and temperature.

Substituting the expressions for the acoustic pressure and velocity into equation ((62)) yields an equation for the power flux along the axial direction:

$$\frac{d\dot{W}}{dz} = \frac{A}{2}\frac{P_0^2 \omega}{\rho_m c_s^2} R\left[i\gamma\left(1 + \frac{(\gamma-1)}{\gamma}G_\kappa^* - \frac{C_1}{K_H C_2}(1 - G_D^*)\right)\cos^2(\phi) - \frac{i}{k_0}\left(\frac{\nabla T_m}{T_m}\left(\frac{G_\kappa/G_\mu - 1}{1 - Pr}\right) + \frac{\nabla C_1}{C_2}\left(\frac{G_D^*/G_\mu^* - 1}{1 - Sc}\right)\right)\cos(\phi)\sin(\phi) - \frac{1}{G_\mu}\sin^2(\phi)\right] \quad (66)$$

where, for notational convenience, $\nabla T_m, \nabla C_1$ replace $dT_m/dz, dC_1/dz$, respectively.

This expression may be numerically integrated along the length of the stack, thus accounting for the axial variation of the physical properties of the mixture with composition and temperature. However, a significant simplification can be achieved by employing the "short stack" approximation, whereby the stack is assumed to be significantly shorter than a wavelength, and physical properties may be regarded as constants, evaluated at, for example, their mid-stack value. This approximation is employed in the present example. The stack is placed mid-way between the pressure and velocity anti-nodes, where φ=π/4. In boundary layer limit ($\delta_i \ll R$, i=κ,D) the dissipation functions are reduced to the form $$G_i = 1 - (1-i)\frac{\delta_i}{R},$$

and it is assumes that the fluid is inviscid, or $G_\mu=1$, Pr=0, Sc=0.

With these assumptions, equation (66) may now be written as $$\frac{\dot{W}}{L_s A} = \frac{1}{4}\frac{P_0^2}{\rho_m c_s}\left(\frac{\delta_\kappa}{R}\frac{\nabla T_m}{T_m} + \frac{\delta_D}{R}\frac{\nabla C_1}{C_2}\right) - \frac{1}{4}\frac{\omega P_0^2(\gamma-1)}{\rho_m c_s^2}\left(\frac{\delta_\kappa}{R} + \frac{\gamma}{\gamma-1}\frac{C_1}{K_H C_2}\frac{\delta_D}{R}\right), \quad (67)$$

with $L_s$ denoting the stack length.

The first term is responsible for the acoustic amplification, and the second describes the dissipation due to relaxation processes through mass diffusion and thermal conduction.

This expression may be manipulated further, by recalling the definitions of the critical gradients for temperature and partial pressure, $$\nabla T_c = \frac{\omega P'}{\rho_m c_p u'} = \frac{\omega c_s}{c_p}$$

and $$\nabla P_c = \frac{P_1 \omega}{u'} = \frac{C_1 P_0 \omega}{P_0 / \rho_m c_s} = C_1 \omega \rho_m c_s.$$

Additionally, the relations $\nabla P_1 = P_0 \nabla C_1$, $(\gamma-1)/\rho_m c_s^2 = 1/T_m c_p$ and $P_0 = \rho_m c_s^2/\gamma$ are used, and the following relation is obtained $$\frac{\dot{W}}{L_s A} = \frac{1}{4} \frac{P_0^2 \omega}{\rho_m T_m c_p} \frac{\delta_\kappa}{R} (\Gamma_T - 1) + \frac{1}{4} \frac{P_0^2 \omega C_1}{P_2} \frac{\delta_D}{R} (\Gamma_P - 1), \quad (68)$$

Note the appearance of $P_2$, the non-reactive gas partial pressure, in the denominator of the second term, representing the power flow due to the phase exchange process. This can be explained as due to the fact that the relative pressure/volume changes depend on the ratio of reactive to non-reactive components. When the mixture is composed predominantly of the non-reactive component, the pressure changes incurred through the phase exchange have a small over-all effect and hence less work is performed.

Results and Discussion

When $\dot{W} \geq 0$ self-sustained oscillations occur. Additional dissipation, e.g., due to losses in remaining segments of the resonator, can be readily calculated by the skilled person, for example, using equation ((66)) with the concentration and temperature gradients set to zero.

The mixture considered in this example consists of air and water vapor at atmospheric pressure. Values of the various physical constants were calculated based on properties of an ideal mixture, and transport coefficients were calculated employing the kinetic theory of gases. In all calculations presented, $K_H$ has been assigned a value of unity.

Considering the isothermal case, $dT_m/dz=0$, where a concentration gradient is imposed along the axial direction, the short stack approximation can be written as $$-\tilde{W} = \frac{\gamma - 1}{4} \mathfrak{I}[G_\kappa] + \frac{\gamma}{4} \frac{C_1}{C_2} \mathfrak{I}[G_D] + \frac{\mathfrak{I}[G_\mu]}{4|G_\mu|^2} + \frac{1}{4 k_0 C_2} \frac{\mathfrak{I}[G_D^*/G_\mu^*]}{1 - Sc} \frac{\Delta C}{L_s}, \quad (69)$$

with $\mathfrak{I}[\cdot]$ denoting the imaginary part of a complex quantity, and, for ease of presentation, the scaled work flow has been defined as $$\tilde{W} = \frac{\dot{W} \rho_m c_s^2}{L_s A \omega P_0^2}. \quad (70)$$

Figure 11:
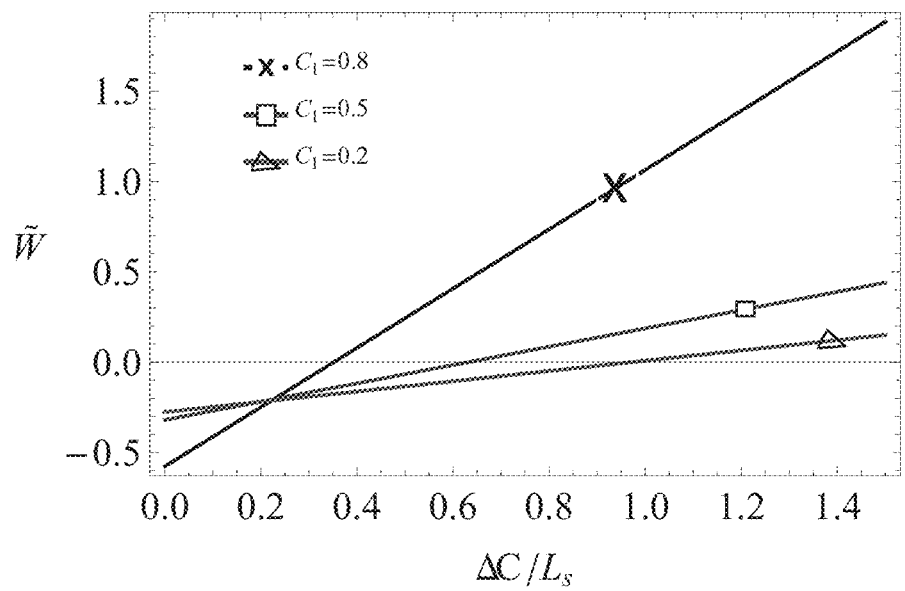
FIG. 11 shows the scaled power flow through a stack as a function of the applied concentration gradient, as calculated according to some embodiments of the present invention for various values of the mean mole fraction, $C_1$, of a reactive substance.

A representative calculation of $\tilde{W}$, as a function of the imposed concentration gradient, is shown in FIG. 11 for $C_1=0.2$ (line with triangle marking), 0.5 (line with square marking) and 0.8 (line with x marking). The intersection of the plotted lines with the horizontal axis represents the transition from work absorption to production by the stack. As shown, varying the mean mole fraction results in a higher gradient required for onset. This effect is explainable since the oscillating partial pressure, which drives the phase exchange, is dependent upon the local mole fraction of the component.

Figure 12A:
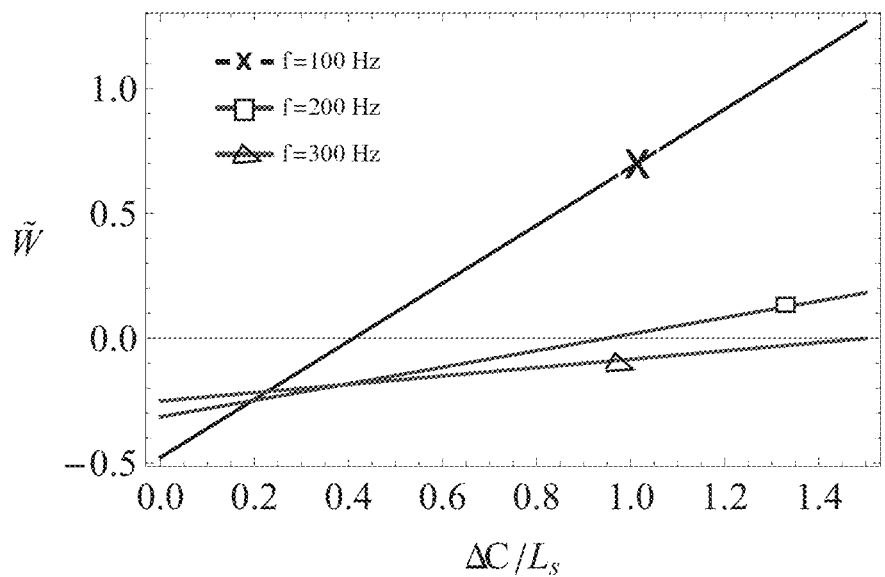
FIGS. 12A-12B show the effect of an oscillation frequency, f, and an applied concentration gradient $\Delta C/L_s$, on a scaled power flow through a stack, as calculated according to some embodiments of the present invention.
Figure 12B:
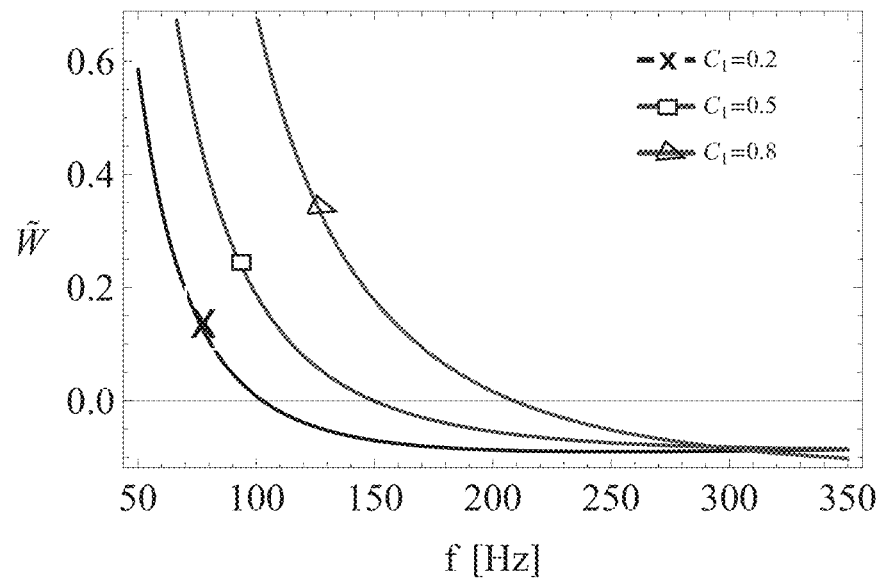

The effect of the operating frequency f and the applied concentration gradient $\Delta C/L_s$ is shown in FIGS. 12A-12B, where FIG. 12A shows $\tilde{W}$ as a function of $\Delta C/L_s$ for $C_1=0.8$ and f=100 Hz (line with x marking), 200 Hz (line with square marking) and 300 Hz (line with triangle marking); and FIG. 12A shows $\tilde{W}$ as a function of f for $C_1=0.2$ (line with x marking), 0.5 (line with square marking) and 0.8 (line with triangle marking). As shown, lower frequency leads to a lower required gradient for onset. This is due to the dependence of viscous losses on the frequency.

A stability curve for the onset concentration gradient curves $\tilde{\Delta}C$ can be calculated using the definition $\tilde{\Delta}C=\Delta C/k_0 L_s$, and the relation $\alpha_D=\alpha_\mu\sqrt{Sc}$. Assuming that the thermal and viscous penetration depths are comparable, a stability limit can be calculated by setting equation (69) equal to zero and solving for $\tilde{\Delta}C$:

$$\tilde{\Delta}C = \frac{C_2(1-Sc)}{\mathfrak{I}[G_D^*/G_\mu^*]} \left( (\gamma-1) \mathfrak{I}[G_\kappa] + \gamma \frac{C_1}{C_2} \mathfrak{I}[G_D] + \frac{\mathfrak{I}[G_\mu]}{|G_\mu|^2} \right) \quad (71)$$

Figure 13A:
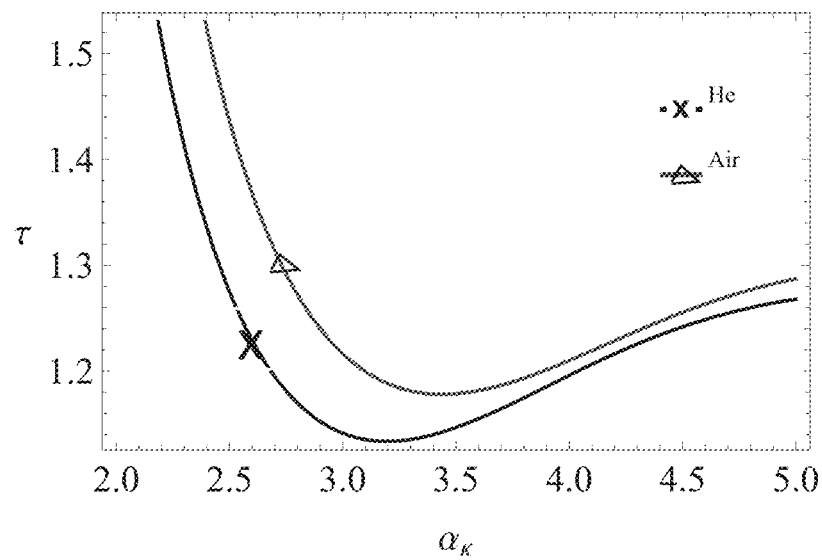
FIGS. 13A-13B show stability curves in terms of the thermal and diffusion disturbance numbers, $\alpha_K$ and $\alpha_D$, respectively.

FIG. 13A shows stability curves of a scaled temperature difference $\rho=\Delta T/T_m k_0 L_s$, as a function of the thermal disturbance number, $\alpha_\kappa$. The curves were calculated for a helium-air mixture, and for the temperature driven case.

Figure 13B:
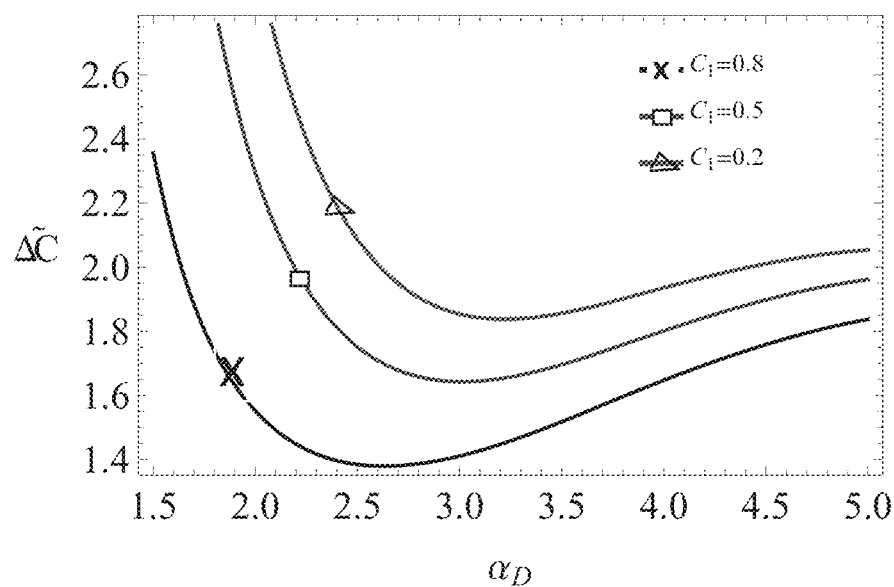

FIG. 13B shows stability curves of $\tilde{\Delta}C$ as a function of the diffusion disturbance number, $\alpha_D$, calculated for air-water vapor mixture and for the concentration-driven case.

Although a direct comparison between the two cases is not straightforward, both figures show similar characteristic curves, with a distinct minimum attainable at a certain value of the disturbance number. In the concentration-driven case (FIG. 13B), a change in the ambient mole fraction results in a shift of the stability curve; a lower mole fraction results in a slightly higher concentration gradient and a shift to a higher optimal value of $\alpha_D$.

The calculations presented in this example demonstrate the ability of the present embodiments to induce spontaneous oscillations due solely to an imposed concentration gradient.

Example 2

Following is a description of an experiment performed in accordance with some embodiments of the present invention to demonstrate amplification of pressure fluctuations in the presence of evaporation.

Figure 14:
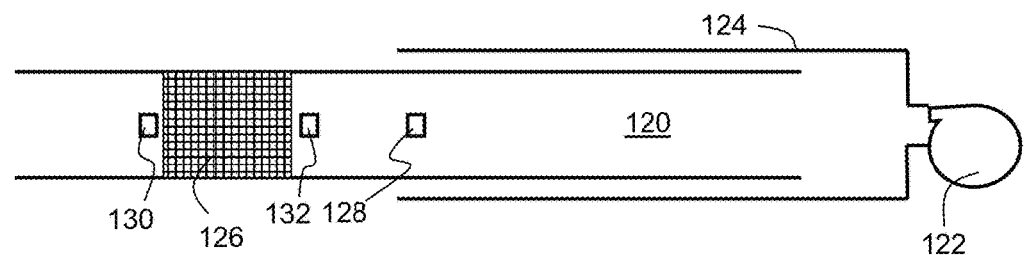
FIG. 14 is a schematic illustration of a prototype system was constructed, according to some embodiments of the present invention.

A prototype system was constructed for the purpose of this experiment. The prototype system is illustrated in FIG. 14. The prototype system included a 1 m long and about 78 mm internal diameter plexiglass tube, open at both ends, which served as the acoustic resonator 120. A fan 122 with a heating element was connected via a thermally insulated flexible sleeve 124. A 10 cm long piece of ceramic honeycomb (600 cpsi) was used as a stack 126. The ceramic honeycomb was soaked in tap water for the wet experiments.

Pressure measurements were made using a microphone 128, placed approximately at the middle of the tube. Temperatures were monitored through two type K thermocouples 130, 132 at the stack ends. The temperatures measured by thermocouple 130 where generally lower than those measured by thermocouples 132, indicating a cooling effect imparted by the evaporation within the stack.

A typical experiment began with placement of the wet stack within the resonator tube, along with the thermocouples and microphone, which were connected to a data logger and oscilloscope/frequency analyzer, displayed on a personal computer. Pressure and temperature monitoring began as soon as the fan was turned on. The RMS value of the pressure amplitude spectrum was recorded. All experiments showed distinctive peaks at frequencies which corresponded to the fundamental mode of the resonator (approximately 170 Hz) as well the fan first and second harmonics (at 50 and 100 Hz, respectively). Typical temperatures at the hot 132 and cold 130 ends of stack 126 were 65-75° C. and 31-37° C., respectively.

Once all the water was evaporated, a sharp increase in the outlet temperature was immediately observed, concomitant with a decrease of the measured pressure amplitude, indicating amplification resulting from evaporation within the stack.

Figure 15A:
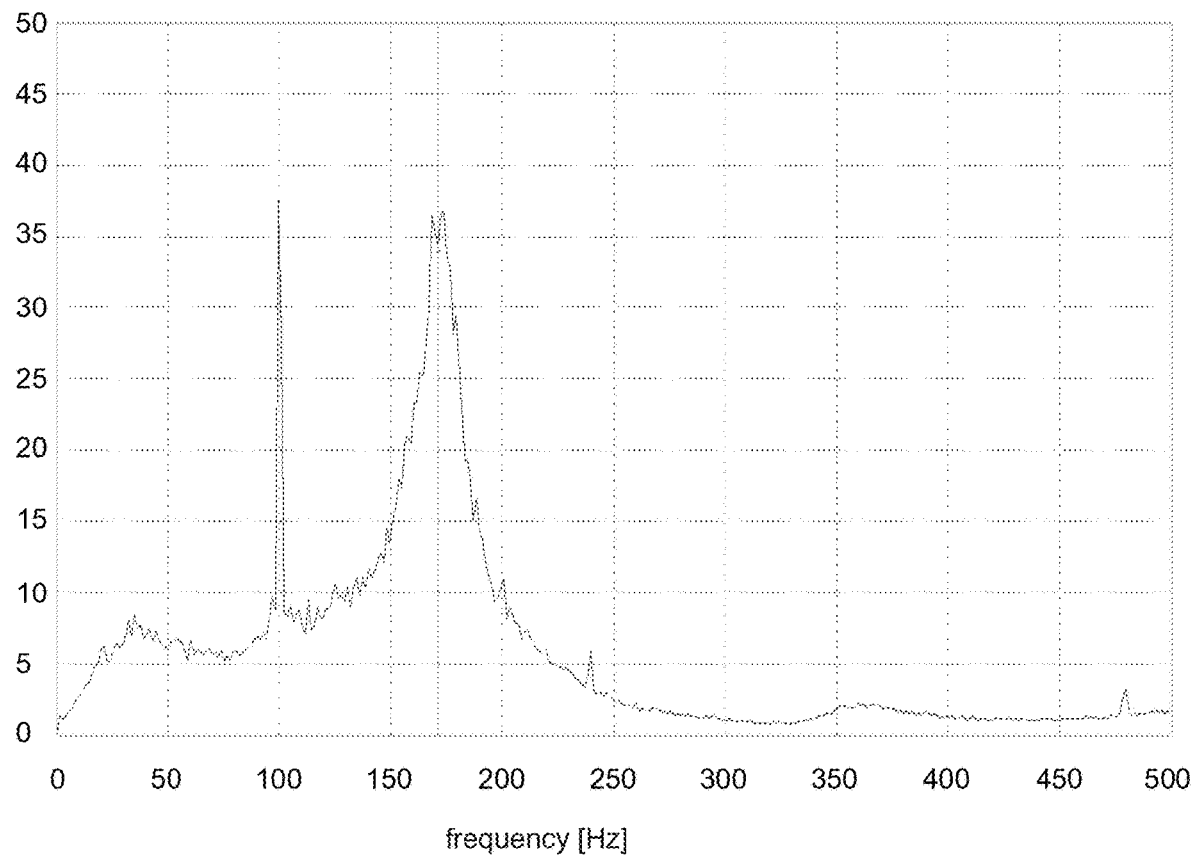
FIGS. 15A-15B show RMS sound pressure amplitude as a function of the frequency, as measured in experiments performed according to some embodiments of the present invention using the prototype system of FIG. 14.
Figure 15B:
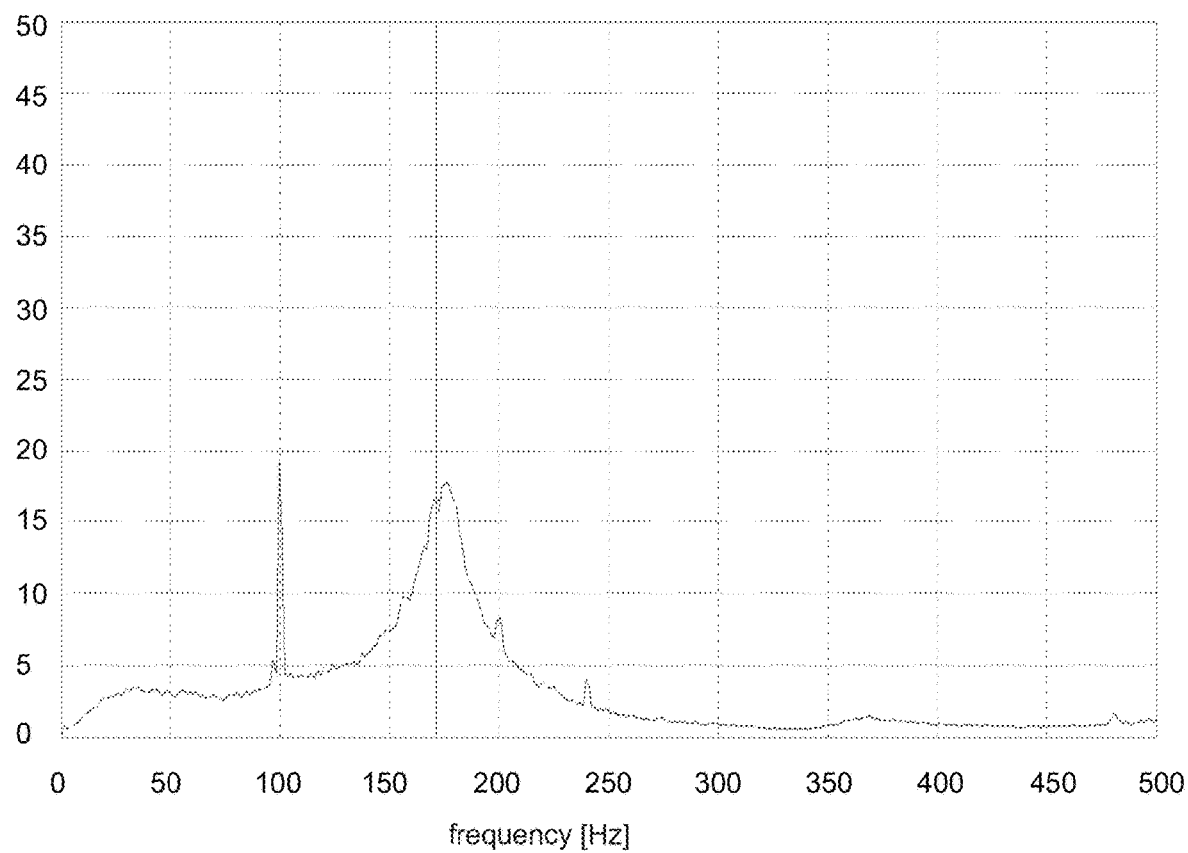

Representative experimental results are shown in FIGS. 15A-15B, each showing a set of experiments conducted under identical conditions. Shown in FIGS. 15A-15B is the RMS pressure amplitude in arbitrary units as a function of the frequency in Hz. As shown, maximum amplification was observed at the high fan setting, with nearly two-fold higher amplitude measured in the presence of evaporation.

The present Example demonstrates the ability of the present embodiments to convert energy by forming a concentration gradient over a stack.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of material separation, comprising:
introducing a fluid medium having at least a first substance and a second substance into an acoustic resonator;
generating a pressure wave in said resonator, to form within said resonator a region of high concentration of said first substance and a region of low concentration of said first substance, to effect a change between a gaseous phase and a non-gaseous phase for said first substance; and
storing at least said first substance separated from said fluid medium, thereby storing a phase-separation energy.

2. The method according to claim 1, further comprising converting said phase-separation energy to energy other than phase-separation energy.

3. The method according to claim 1, wherein said resonator is partially occupied by a sorbent medium wherein said regions of high and low concentrations of said first substance are formed within said sorbent medium.

4. The method according to claim 3, wherein said sorbent medium is selective for said first substance, and has inert relations with any other species in said fluid medium.

5. The method according to claim 3, wherein said sorbent medium is contained in a porous stack.

6. The method according to claim 1, wherein said first substance is water vapor.

7. The method according to claim 1, wherein said fluid medium comprises air and water vapor.

8. The method according to claim 1, wherein said first substance is other than water vapor.

9. The method according to claim 1, wherein said second substance comprises brine.

10. The method of claim 1, wherein said storing comprises extracting said at least said first substance at a pressure node of said pressure wave into a storage container.

* * * * *